US011382145B2

(12) United States Patent
Dao et al.

(10) Patent No.: US 11,382,145 B2
(45) Date of Patent: Jul. 5, 2022

(54) SYSTEMS AND METHODS TO SUPPORT GROUP COMMUNICATIONS

(71) Applicants: Ngoc Dung Dao, Ottawa (CA); Xu Li, Nepean (CA)

(72) Inventors: Ngoc Dung Dao, Ottawa (CA); Xu Li, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/531,089

(22) Filed: Aug. 4, 2019

(65) Prior Publication Data

US 2020/0045753 A1 Feb. 6, 2020

Related U.S. Application Data

(60) Provisional application No. 62/714,903, filed on Aug. 6, 2018.

(51) Int. Cl.
*H04W 76/10* (2018.01)
*H04W 48/16* (2009.01)
*H04W 4/06* (2009.01)

(52) U.S. Cl.
CPC ............ *H04W 76/10* (2018.02); *H04W 4/06* (2013.01); *H04W 48/16* (2013.01)

(58) Field of Classification Search
CPC ..... H04W 76/10; H04W 76/12; H04W 76/14; H04W 76/18; H04W 76/19; H04W 76/27;
(Continued)

(56) References Cited

U.S. PATENT DOCUMENTS

2014/0006793 A1    1/2014   Donovan et al.
2016/0242216 A1    8/2016   Zhao et al.
(Continued)

FOREIGN PATENT DOCUMENTS

CA        3047037 A1    11/2018
CN     108174421 A     6/2018
(Continued)

OTHER PUBLICATIONS

"System Architecture for the 5G System; Stage 2"; 3GPP TS 23.501 V15.2.0 (Jun. 2018).
(Continued)

*Primary Examiner* — Peter Chen

(57) ABSTRACT

A plurality of methods for unicast and group communication delivery of Downlink (DL) group communication data to a plurality of User Equipment's (UEs) are used by embodiments of this invention. These methods include two architectures wherein both architectures include a first AMF, AMF-1, which has an N1 connection to UE and both AMF-1 and a second AMF, the network control function, have an N2 connection to the RAN. In the first architecture, AMF-1 supports unicast data delivery and a second AMF, the network control function, supports GC data delivery. AMF-1 and the network control function have no direct connection between each other in the first architecture. In the second architecture, AMF-1 supports unicast data delivery and the network control function supports group communication data delivery. In the second architecture, the network control function and AMF-1 are connected by an interface.

12 Claims, 12 Drawing Sheets

(58) Field of Classification Search
CPC ..... H04W 48/00; H04W 48/02; H04W 48/08; H04W 48/16; H04W 48/18; H04W 48/20; H04W 4/06; H04W 4/08; H04L 65/1066; H04L 65/1069; H04L 65/1073

See application file for complete search history.

(56) References Cited

U.S. PATENT DOCUMENTS

| | | | |
|---|---|---|---|
| 2017/0078371 A1* | 3/2017 | Kodaypak | H04L 12/189 |
| 2017/0237808 A1 | 8/2017 | Kodaypak | |
| 2018/0192289 A1 | 7/2018 | Dao | |
| 2018/0199279 A1* | 7/2018 | Baek | H04W 48/18 |
| 2019/0158985 A1 | 5/2019 | Dao et al. | |
| 2019/0166467 A1* | 5/2019 | Livanos | H04W 8/186 |
| 2019/0223250 A1 | 7/2019 | Dao | |
| 2020/0344725 A1* | 10/2020 | Liu | H04W 28/0268 |

FOREIGN PATENT DOCUMENTS

| | | |
|---|---|---|
| CN | 108289319 A | 7/2018 |
| CN | 108323245 A | 7/2018 |
| CN | 108370600 A | 8/2018 |

OTHER PUBLICATIONS

"Procedures for the 5G System; Stage 2"; 3GPP TS 23.502 V15.2.0 (Jun. 2018).

SA WG2 Meeting #128,52-186842,Solution for broadcast KI,Huawei, HiSilicon,Vilnius, Lithuania, 2 Jul. 6, 2018,total 3 pages.

SA WG2 Meeting #120,52-172285,TS 23.502: Deriving Services Provided by UDM from End-to-end Flows,Huawei, HiSilicon,Mar. 27-31, 2017, Busan, Korea,total 8 pages.

Huawei, HiSilicon, Solution on KI#16: Support of Group Communication and Messaging. SA WG2 Meeting #128, Jul. 2-6, 2018, Vilnius, Lithuania, S2-186733, 5 pages.

3GPP TS 23.501 V15.2.0 (Jun. 2018), 3rd Generation Partnership Project; Technical Specification Group Services and System Aspects; System Architecture for the 5G System; Stage 2(Release 15), 216 pages.

* cited by examiner

SYSTEMS AND METHODS TO SUPPORT GROUP COMMUNICATIONS

CROSS-REFERENCE TO RELATED APPLICATIONS

This application claims the benefit of priority to U.S. Patent Application Ser. No. 62/714,903, entitled "SYSTEMS AND METHODS TO SUPPORT GROUP COMMUNICATIONS" filed Aug. 6, 2018, which is hereby incorporated by reference in its entirety.

FIELD OF THE INVENTION

The present invention generally pertains to the field of Communications Networks, and particular embodiments or aspects relate to data transmission from a single data source to multiple electronic devices by using multiple unicast transmission, or multicast transmission, or broadcast transmission, or any combinations thereof.

BACKGROUND

An Electronic Device (ED), for example a User Equipment (UE), may have data connections to receive unicast, multicast or broadcast data. In current 5G systems, one Access Management Function (AMF) instance is selected to support individual UEs for unicast data session, also known as PDU (Protocol Data Unit) Session. This is described in 3GPP Technical Specifications 23.501 and 23.502. However, congestion can occur as the use of unicast sessions send the same data to multiple UEs increases the network resource usage. Accordingly, it is desirable for improved solutions to transmit the same data to multiple UEs which has more flexibility to handle increasing demands.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

An aspect of the disclosure provides a method for managing a group communications (GC) session. The method is performed by an Access Management Function (AMF) and includes: receiving a GC session establishment request from a session management function (SMF); transmitting to an access node, the GC session establishment request; receiving a GC session establishment response from the access node, transmitting the GC session management response to the session management function; and communicating with the access node over a service based interface to cause the access node to support a group communication session with a first UE. In some embodiments, the AMF is selected by the session management function (SMF). In some embodiments, the method includes selecting a data management function and transmitting a GC session information request to the to the data management function, and receiving a GC session information response from the data management function with the GC session information response comprising parameters of the GC session. In some embodiments, the method includes selecting a policy control function (PCF) and transmitting a GC session policy request to the policy control function (PCF), and receiving a GC session policy response from the policy control function where the GC session policy response comprising an access and mobility management policy for the GC session. In some embodiments, the AMF selects the session management function (SMF). In some embodiments, the method includes discovering the access node associated with the first UE. In some embodiments, the method includes transmitting a GC serving function registration request to the data repository function, and receiving a GC serving function registration response from the data repository function where the GC serving function registration response includes information associating a UE group and a network resource and the UE group includes the first UE. In some embodiments, the first UE is one of a plurality of UEs and the GC session comprises a broadcast communication to the plurality of UEs. In some embodiments, the first UE is one of a plurality of UEs and the GC session comprises a multicast communication to the plurality of UEs. In some embodiments, the first UE is one of a plurality of UEs and the plurality of UEs is defined by a group identifier.

An aspect of the disclosure provides a method for managing a group communications (GC) session. The method includes transmitting, by an Access Management Function (AMF), a discover access management function request to a network discovery function to identify a first unicast AMF. The first unicast AMF is configured to manage access and mobility for a first UE associated with an access node. The method also includes receiving, by the AMF, a GC session announcement request, sent by a session management function, transmitting, by the AMF, the GC session announcement request to the first unicast AMF, receiving, by the AMF, a GC session announcement response sent by the first unicast AMF, transmitting the GC session announcement response to the session management function, receiving, by the AMF, a GC session announcement notification sent by first unicast AMF, transmitting, by the AMF, the GC session announcement notification to the session management function, and communicating, by the AMF, with the access node over a service based interface to cause the access node to support a group communication session with the first UE. The AMF acts as a proxy for communications between the first unicast AMF and the session management function. In some embodiments, transmitting by the AMF to the first unicast AMF and receiving from the first unicast AMF by the AMF is done over the service based interface. In some embodiments, the AMF acts as a proxy for communications between a plurality of unicast access management functions (AMFs) and the session management function (SMF) and the first unicast AMF is one of the plurality of access management functions (AMFs). In some embodiments, the first UE is one of a plurality of UEs and the GC session comprises a broadcast communication to the plurality of UEs. In some embodiments, the first UE is one of a plurality of UEs and the GC session comprises a multicast communication to the plurality of UEs. In some embodiments, the first UE is one of a plurality of UEs and the plurality of UEs is defined by a group identifier.

An aspect of the disclosure provides an electronic device including a network interface, a processor, and a non-transient memory for storing instructions. When executed by the processor, the instructions cause an access mobility function (AMF) of the electronic device to transmit a discover access management function request to a network discovery function to identify a first unicast AMF. The first unicast AMF is configured to manage access and mobility for a first UE associated with access node. When executed by the processor, the instructions cause the AMF to Receive from a session management function, a GC session announcement request. Transmit the GC session announcement request to the first unicast AMF. Receive from the first unicast AMF, a GC session announcement response. Transmit the GC session announcement response to the session management function. Receive from the first unicast AMF, a GC session announcement notification. Transmit the GC session announcement notification to the session management function. Communicate with the access node over a service based interface to cause the access node to support a group communication session with the first UE. The AMF acts as a proxy for communications between the first unicast AMF and the session management function. In some embodiments, transmitting from the AMF to the first unicast AMF and receiving from the first unicast AMF by the AMF is done over the service based interface. In some embodiments, the AMF acts as a proxy for communications between a plurality of unicast access management functions and the session management function, the first unicast AMF being one of the plurality of access management functions. In some embodiments, the first UE is one of a plurality of UEs and the GC session comprises a broadcast communication or a multicast communication to the plurality of UEs.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
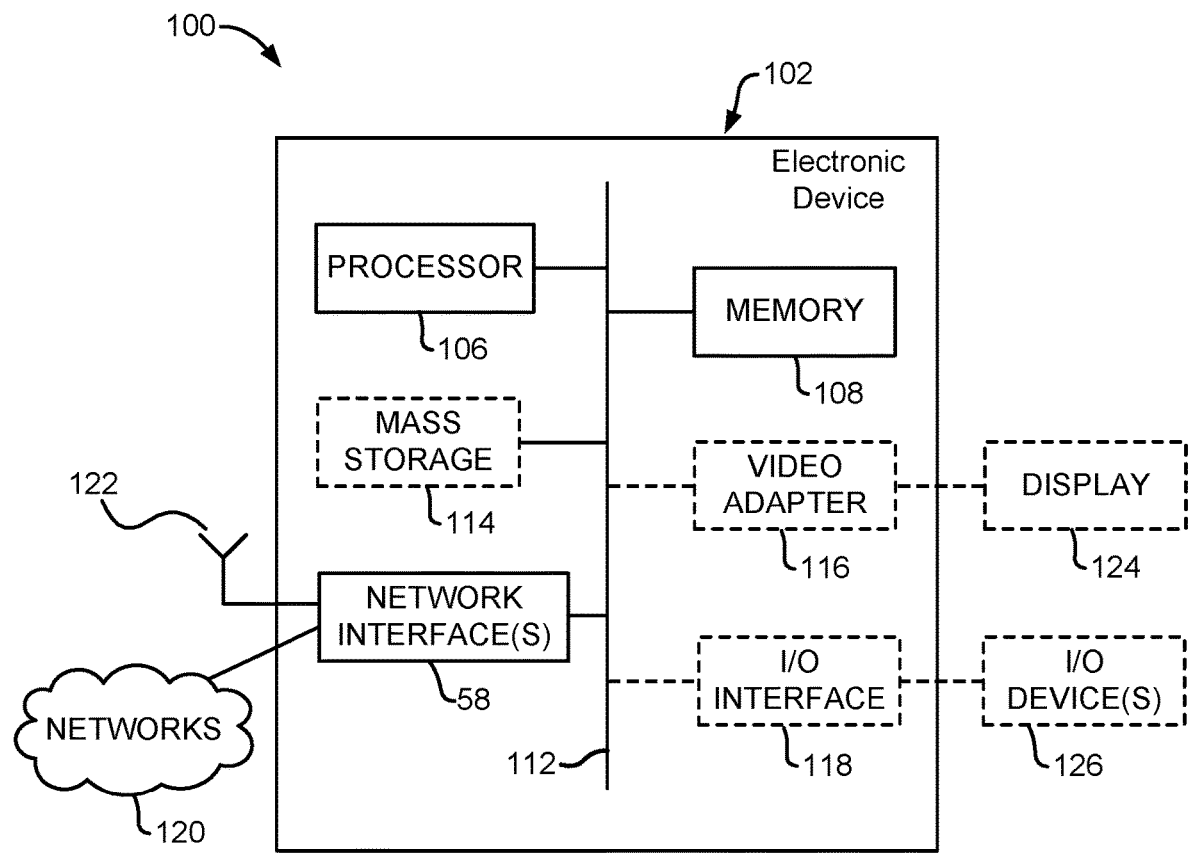
FIG. 1 is a block diagram of an electronic device within a computing and communications environment that may be used for implementing devices and methods in accordance with representative embodiments of the present invention.

In the following description, features of example embodiments of the present invention are described. For convenience of description, these embodiments make use of features and terminology known from communication system specifications, such as 4G and 5G networks, as defined by the Third Generation Partnership Project (3GPP). However, it shall be understood that the present invention is not limited to such networks.

In this specification, the term group communication (GC) Session will be used. A GC Session can include: multiple unicast sessions; one or more multicast sessions; one or more broadcast sessions; a combination of one or more unicast sessions and one or more broadcast sessions; a combination of one or more unicast sessions and one or more multicast sessions; a combination of one or more broadcast sessions and one or more multicast session, a combination of one or more unicast sessions, one or more broadcast sessions and one or more multicast sessions. A unicast session is a data session in which data is sent from a single data source to a single UE. The unicast session may also be called PDU Session. A multicast session is a data session in which data is sent from a single source to a group of authorized UEs. A broadcast session is a data session in which, data is sent from a single source to any UE that is authorized to receive the data. In some cases, the authorization for a UE to receive data of a broadcast session may be not required.

An aspect of the invention is directed to a core network (CN) control function (also referred to herein as a core network (CN) control plane function) within a wireless communication network for supporting GC Sessions. Such a CN control function interacts with other CN control functions, such as a Network Exposure Function (NEF), a Session Management Function (SMF) and an Access Management Function (AMF). There can be multiples of these functions. For example there can be multiple AMFs within a CN, with each AMF being associated with one or more UEs. Referring to one of these AMFs as a first AMF, the first AMF is configured to manage access and mobility for UEs including an example UE referred to as the first UE. Embodiments will be discussed in which the AMF has a defined interface (referred to as an N1 interface) for communicating with the UEs for which it is associated, and a defined interface (referred to as an N2 interface) for communicating with radio access nodes of the Radio Access Network (RAN) or non 3GPP access nodes of any Access Network, such as non-3GPP fixed or wireless access networks. In case of non-3GPP access network, an Inter-Working Function (IWF) may be required to provide signalling support between the AMF and non 3GPP access nodes. The CN control function, after receiving one or more messages from a CN of the wireless communication network, communicates with an access node of an access network, such a radio access node of a radio access network, over a control plane interface to cause the access node to support a GC Session with a plurality of UEs, including the first UE. In some embodiments the control plane interface is the N2 interface.

In an embodiment, the CN control function is a second AMF function that operates separately from the first AMF. It is noted that while existing networks utilize multiple AMFs, each UE may be served by a single AMF. Accordingly, it is noted that in embodiments in which the CN control function is a second AMF function that operates separately from the first AMF, both the first AMF and the second AMF can be associated with a particular UE, with the first AMF handling conventional AMF functionality for the particular UE, such as to support access and mobility management and unicast PDU Sessions of the UE, and the second AMF handling connection and mobility management for GC Sessions.

In another embodiment, the CN control function can be implemented in the first AMF. The CN control function can be implemented, for example, by configuring the first AMF with the functionality of the CN control function for handling connection and mobility management for GC Sessions.

It is noted that the CN control function can be co-located with the first AMF (e.g., both instantiated within the same network element), but still operate as separate network functions.

Further embodiments will be discussed using examples in which the first AMF is referred to as AMF-1, and the CN control function is referred to as AMF-2.

In an embodiment, the AMF-2 does not have a logical connection, such as N1 interface, to the UE; the AFM-2 has a logical connection to the access node, such as N2 interface or a similar N2 interface with additional messages to support GC Sessions.

In an embodiment, the AMF-2 has a logical connection, such as N1 interface or similar with additional messages for supporting group communication; and the AMF-2 has a logical interface, such as N2 interface with additional messages to support a GC Session.

In an embodiment, the AMF-1 and AMF-2 are two instances of the same AMF set. The AMF set may have a logical function to receive messages from other control plane network functions, such as session management (SM) messages from the SMF, and forward the messages received from other CN control plane functions to either the AMF-1 or AMF-2 according to information included in the message.

In the following, the CN control plane function, such as AMF-2, may have N1 and N2 interfaces to communicate with the UE and access node, respectively for illustrating inventive ideas. In general, the CN control plane function may have a control interface to communicate with the UE, a control interface to interact with access nodes, one or more interfaces to communicate with other CN control plane functions such as the service-based interface using design principles specified in 3GPP TS 23.501 and TS 23.502.

In an embodiment, the SW can select the AMF-2 to support and handle connection and mobility management for the GC Session.

In an embodiment, the AMF-2 can select SW to support GC Session.

In several embodiments, new functionalities may be added to the SW, which is to be specified in 3GPP TS 23.501 and TS 23.502 to handle GC Sessions.

In an embodiment, the new functionalities to handle group communication may be implemented in a separate CN control plane function, for example group communication SMF (GC-SMF).

In several embodiments, a GC Session provides data connections for a plurality of UEs to receive the same data. The data transmitted over the data connections could be one or more PDUs, or one or more data files consisting of multiple packets. In the GC Session, the Core Network (CN) establishes multiple user plane (UP) connections from a User Plane Function (UPF) to multiple (Radio) Access Network ((R)AN) nodes. Each (R)AN node may establish one or more radio channels to send group communication data to one or more UEs served by the (R)AN node. The radio channel could be a unicast radio channel, which could be implemented by data radio bearer (DRB) in 3GPP RAN, of a UE wherein the transmission parameters, including modulation and coding scheme (MCS) and precoding matrix, are selected to match the UE's radio channel propagation. The radio channel could be a multicast radio channel, wherein the transmission parameters, such as MCS and precoding matrix, are selected to support multiple radio channels of multiple UEs. The radio channel could be a broadcast radio channel, where the transmission parameters are selected to support some or any UEs currently served by the (R)AN node.

Those skilled in the art will appreciate that the term Group Communication (GC) session has the same meaning as GC Session.

FIG. 1 is a block diagram of an electronic device (ED) 102 illustrated within a computing and communications environment 100 that may be used for implementing the devices and methods disclosed herein. In some embodiments, the ED 102 may be an element of communications network infrastructure, such as an such as a radio access node (otherwise referred to as a base station) (for example a NodeB, an enhanced Node B (eNodeB), a next generation eNodeB (ng-eNodeB or ng-eNB), a next generation NodeB (sometimes referred to as a gNodeB or gNB)), a home subscriber server (HSS), a gateway (GW) such as a packet gateway (PGW) or a serving gateway (SGW) or communications network infrastructure serving as a core network (CN) that includes various functions within an evolved packet core (EPC) network. In other embodiments, the ED 102 may be a device that connects to network infrastructure over a radio interface, such as a mobile phone, smart phone or other such device that may be classified as a User Equipment (UE), referred to as UE 202 hereinafter. In some embodiments, ED 102 may be a Machine Type Communications (MTC) device (also referred to as a machine-to-machine (m2m) communication device), or another such device that may be categorized as a UE 202 despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The ED 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be any combination of any type of several bus architectures including a memory bus or memory controller, a peripheral bus, or a video bus.

The ED 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is an element of communications network infrastructure, the radio access network interface 122 may be omitted from such elements that include core network control plane functions acting as elements of the core network (CN) other than those at the radio edge (e.g. an eNB). When ED 102 is infrastructure at the radio edge of a network, both wired and wireless network interfaces may be included. When ED 102 is a wirelessly connected device, such as a User Equipment (UE), radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible over the bus 112. The mass storage 114 may comprise, for example, any combination of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form a heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, ED 102 may be a standalone device, while in other embodiments ED 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communication links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

A first embodiment will now be discussed wherein one UE may be served by two AMF functions. The first AMF, AMF-1, serves existing functionalities including UE access and mobility management. The AMF-2 serves GC Session. In this first embodiment, the AMF-2 does not have N1 connection to the UE, the AMF-2 has N2 connections only to support GC Session.

Figure 2:
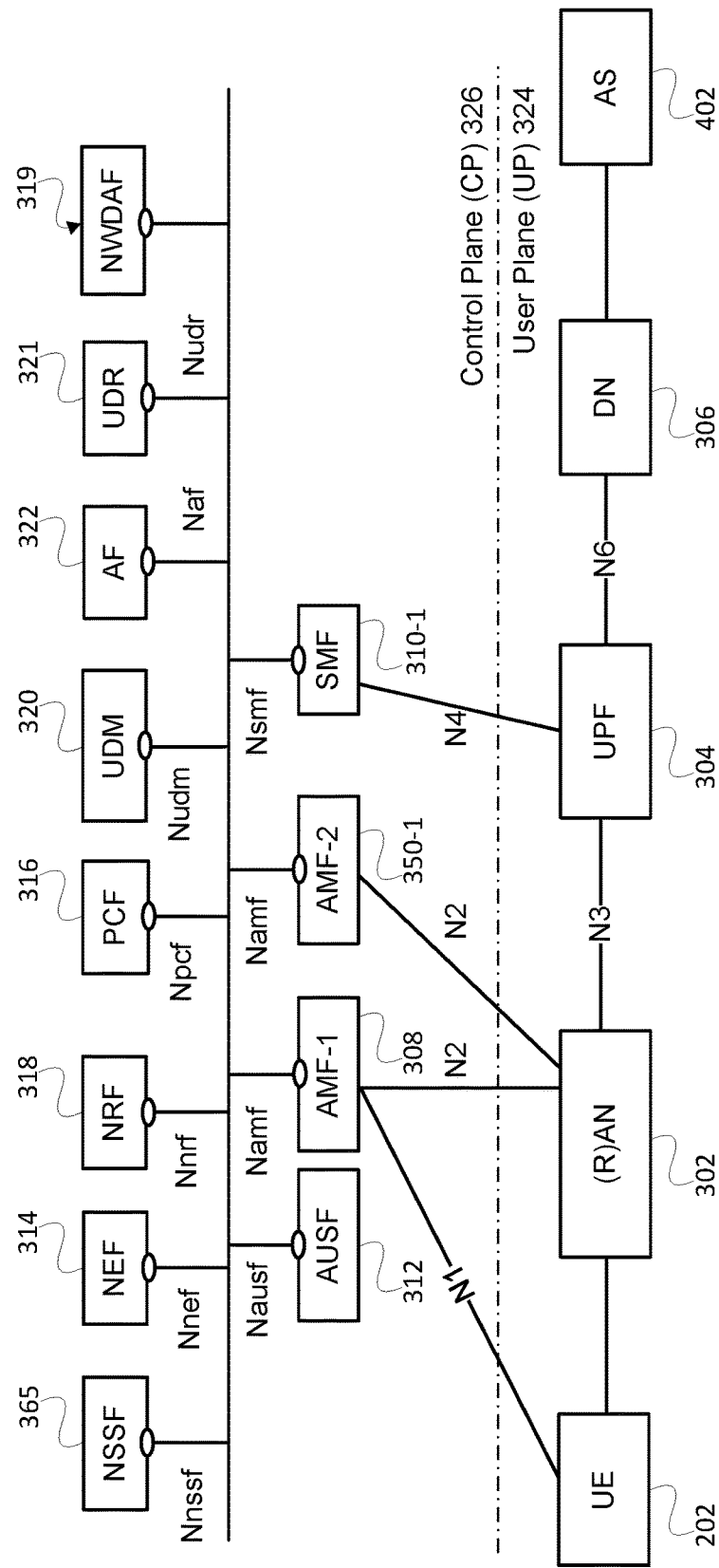
FIG. 2 is a block diagram illustrating a service-based view of a system architecture of a 5G Core Network with two Access Management Functions. The first AMF, AMF-1, is used for supporting unicast communication (or also known as PDU Session) and the second AMF, AMF-2, is used for supporting GC Session.

FIG. 2 illustrates a service-based architecture 300 for a 5G or Next Generation Core Network (5GCN/NGCN/NCN). This illustration depicts logical connections between nodes and functions, and its illustrated connections should not be interpreted as direct physical connections. UE 202 forms a radio access network connection with a (Radio) Access Network ((R)AN) node 302 of a radio access network (RAN) (which may, for example, be an gNodeB (gNB)), which is connected to a User Plane (UP) Function (UPF) 304 such as a UP Gateway over a network interface providing a defined interface such as an N3 interface. The UPF 304 provides a logical connection to a Data Network (DN) 306 over a network interface such as an N6 interface. The radio access network connection between the UE 102 and the (R)AN node 302 may be referred to as a Data Radio Bearer (DRB).

Further details can be found in U.S. Patent Application Ser. No. 62/590,210 entitled "Multicast and Broadcast Services", filed Nov. 22, 2017, which is hereby incorporated by reference in its entirety.

DN 306 may be a data network used to provide an operator service, or it may be outside the scope of the standardization of the Third Generation Partnership Project (3GPP), such as the Internet, a network used to provide third party service, and in some embodiments DN 306 may represent an Edge Computing network or resource, such as a Mobile Edge Computing (MEC) network.

UE 202 also connects to a first Access and Mobility Management Function (AMF-1) 308 through a logical N1 connection (although the physical path of the connection is not direct). The AMF-1 308 is responsible for authentication and authorization of access requests, as well as mobility management functions. In a service based view, the AMF-1 308 can communicate with other core network (CN) control plane (CP) functions 326 through a service based interface denoted as Namf.

The Session Management Function (SMF) 310 is a network function that is responsible for the allocation and management of IP addresses that are assigned to an UE 202 as well as the selection of a UPF 304 (or a particular instance of a UPF 304) for user plane traffic associated with a particular data session of UE 202, such as PDU Session. The SMF 310 can communicate with other core network functions, in a service based view, through a service based interface denoted as Nsmf. The SMF 310 may also connect to a UPF 304 through a logical interface such as network interface N4.

The Authentication Server Function (AUSF) 312 provides authentication services to other network functions over a service based Nausf interface.

A Network Exposure Function (NEF) 314 can be deployed in the 5GCN/NGCN/NCN to allow servers, functions and other entities such as those outside a 3GPP network domain to have exposure to services and capabilities within the network. In one such example, an NEF 314 can act much like a proxy between an Application Function (AF) and/or Application Server (AS) outside the 5GCN/NGCN/NCN and network functions such as the Policy Control Function (PCF) 316, the SMF 310, the UDM 320, the AMF-1 308 and the AMF-2 350, so that the external the AF and/or AS can provide information that may be of use in the setup of the parameters associated with a data session. The NEF 314 can communicate with other network functions through a service based Nnef network interface. The NEF 314 may also have an interface to non-3GPP functions.

A Network Repository Function (NRF) 318 provides network service discovery functionality. The NRF 318 may be specific to the Public Land Mobility Network (PLMN) or network operator, with which the NRF 318 is associated. The service discovery functionality can allow network functions and UEs 202 connected to the 5GCN/NGCN/NCN to determine where and how to access existing network functions, and may present the service based interface Nnrf.

The PCF 316 communicates with other network functions over a service based Npcf interface, and can be used to provide policy and rules to other network functions, including those within the control plane. Enforcement and application of the policies and rules is not necessarily the responsibility of the PCF 316, and is instead typically the responsibility of the functions to which the PCF 316 transmits the policy. In one such example the PCF 316 may transmit policy associated with session management to the SMF 310. This may be used to allow for a unified policy framework with which network behavior can be governed.

A Unified Data Management Function (UDM) 320 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as the other network functions do not need to determine where a particular type of data is stored in the network.

The Network Slice Selection Function (NSSF) 365 allows selecting the set of Network Slice instances serving the UE 202, determining the Allowed NSSAI and, if needed, the mapping to the Subscribed S-NSSAIs, determining the Configured NSSAI and, if needed, the mapping to the Subscribed S-NSSAIs, determining the AMF Set to be used to serve the UE 202, or, based on configuration, a list of candidate AMF(s), possibly by querying the NRF 318.

The PCF 316 may be associated with the UDM 320 because it may be involved with requesting and providing subscription policy information to the Unified Data Repository (UDR) 321, but it should be understood that typically the PCF 316 and the UDM 320 are independent functions.

The PCF 316 may have a direct interface to the UDR 321. The UDM 320 is typically responsible for functionality such as the processing of credentials, location management and subscription management.

The Application Function (AF) 322 represents the non-data plane (also referred to as the non-user plane) functionality of an application deployed within a network operator domain and within a 3GPP compliant network. The AF 322 interacts with other core network functions through a service based Naf interface, and may access network capability exposure information, as well as provide application information for use in decisions such as traffic routing. The AF 322 can also interact with functions such as the PCF 316 to provide application specific input into policy and policy enforcement decisions. It should be understood that in many situations the AF 322 does not provide network services to other network functions, and instead is often viewed as a consumer or user of services provided by other network functions. An application outside the 3GPP network, can perform many of the same functions as the AF 322 through the use of NEF 314.

The UE 202 communicates with network functions that are in the CN User Plane (UP) 324, and the CN Control Plane (CP) 326. The UPF 304 is a part of the CN UP 324 (DN 306 being outside the 5GCN). The (R)AN node 302 may be considered as a part of a User Plane, but because it is not strictly a part of the CN, it is not considered to be a part of the CN UP 324. The AMF-1 308, SMF 310, AUSF 312, NEF 314, NRF 318, PCF 316, and UDM 320 are functions that reside within the CN CP 326, and are often referred to as CN Control Plane Functions. AF 322 may communicate with other functions within CN CP 326 (either directly or indirectly through the NEF 314), but is typically not considered to be a part of the CN CP 326.

Those skilled in the art will appreciate that there may be a plurality of UPFs connected in series between the (R)AN node 302 and the DN 306, and multiple data sessions to different DNs can be accommodated through the use of multiple UPFs in parallel.

In the architecture illustrated by FIG. 2, the AMF-1 308 is selected when UE 202 performs the UE Registration procedure.

In one embodiment of the service-based architecture 300 illustrated in FIG. 2, UE 202 is simultaneously connected to both unicast and GC Sessions, and the AMF-2 350-1 has no N1 connection to UE 202. Accordingly the AMF-2 350-1 does not send messages to UE 202 directly. The AMF-2 350-1 supports CN functions to establish and manage the GC Session. AMF-1 308 supports CN functions in order to exchange messages between UE 202 and CN functions. The AMF-2 350-1 may support all functionality of AMF-1 308. In addition, the AMF-2 350-1 may support functionality related to GC Session operations, including establishing, modifying, and releasing one or more GC Sessions. The SMF 310 may send control plane messages related to GC session for UE 202 via the AMF-1 308; and the SMF 310 may send control plane messages to the (R)AN node 302 via the AMF-2 350-1.

Figure 3:
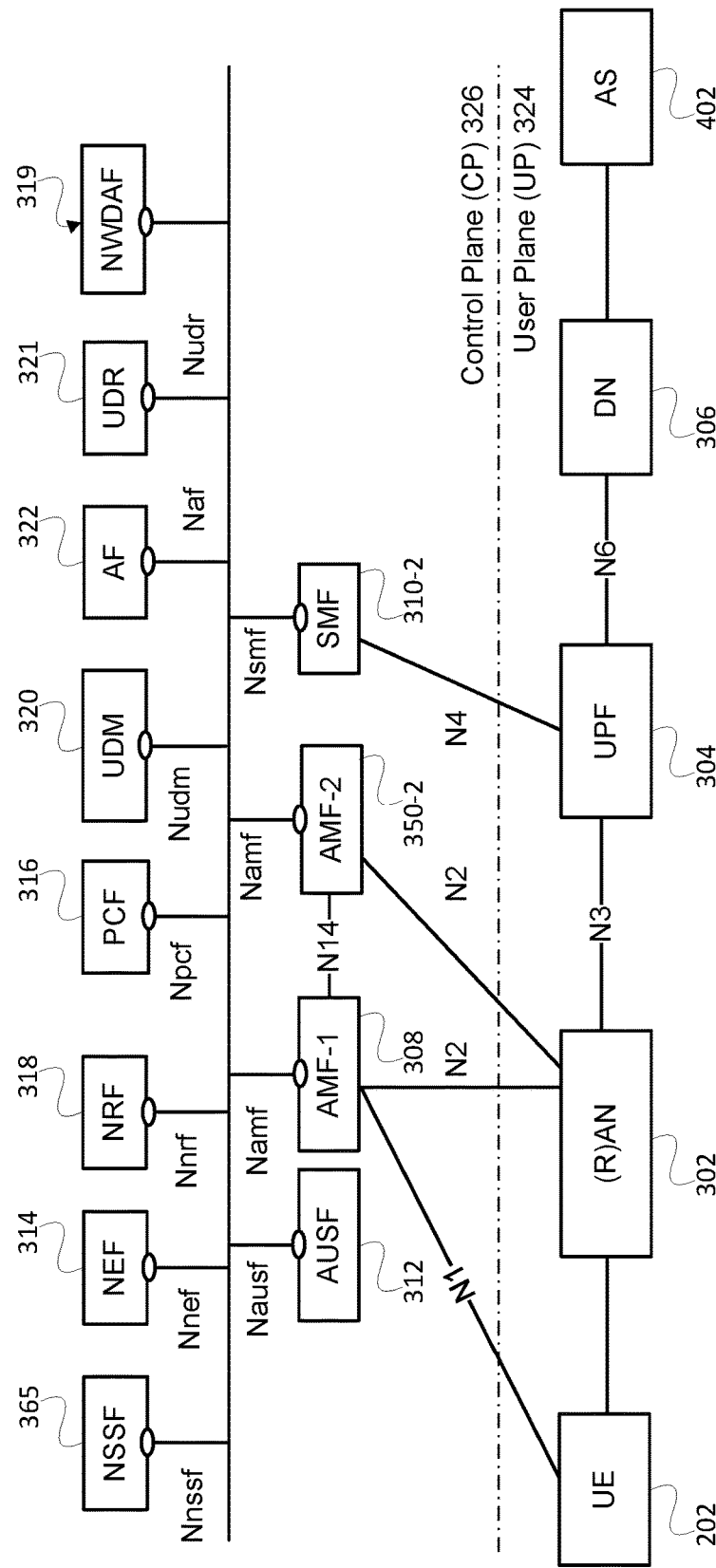
FIG. 3 is a block diagram illustrating a service-based view of a system architecture of a 5G Core Network with two AMFs, wherein the AMF-2 communicates with the UE over AMF-1.

In another embodiment of the service-based architecture 400 illustrated in FIG. 3, the AMF-2 350-2 has no connection to the UE 202 but is capable of communicating with AMF-1 308 through a logical interface, such as network interface N14. The SMF 310-2 sends N1 session management (SM) messages related to GC Session to the AMF-2 350-2 and the AMF-2 350-2 forwards the SM messages from SMF 310-2 to AMF-1 308 through the service based interface Namf, which is also referred to as N14 reference point. The AMF-1 308 supports CN functions to exchange messages between UE 202 and the AMF-2 350-2. The AMF-2 350-2 supports message exchanges between the AMF-1 308 and the SMF 310-2. In the service-based architecture shown in FIG. 3, the MSF 310-2 has some or all the functionalities of the SMF 310-1 shown in the service-based architecture of FIG. 2, with additional functionality described above. Similarly, the AMF-2 350-2 has some or all the functionalities of the AMF-2 350-1 shown in the service-based architecture of FIG. 2, with additional functionality described above. Hereinafter, the MSF 310-1 and MSF 310-2 are generally referred to as MSF 310, and collectively as SMFs 310, and AMF-2 350-1 and AMF-2 350-2 are generally referred to as AMF 350, and collectively as AMFs 350.

In another embodiment of the service-based architecture 300 illustrated by FIG. 2, when UE 202 has simultaneous unicast and GC Sessions, the functionality of the core network control function (the AMF-2 350) may be incorporated within the AMF-1 308 and such an enhanced the AMF-1 308 may serve all the UEs 202 that join the GC Session in its service area.

When two different AMF functions are selected, the AMF-1 308 supports the unicast PDU session functions and the AMF-2 350 supports GC Session functions. The AMF-1 308 is also used to transfer messages between UE 202 and core network functions related to GC Session.

In some embodiments, AMF-1 308 may receive GC Session related configuration messages from SMF 310 that are to be sent to UE 202. This means that the SMF 310 may send the same information related to GC Sessions to multiple AMFs, when UEs joining GC Session are served by different AMFs. In some embodiments, the AMF-1 308 may also receive GC Session messages from UE 202. In some embodiments, the AMF-1 308 may forward the GC Session messages received from UE 202 to a CN function, such as the MSF 310, AMF-2 350, PCF 316, NEF 314, AF 322, Network Data Analytics Function (NWDAF) 319, and to a Network Management Function (NMF) (not shown) such as Operation, Administration, and Maintenance (OAM) system (not shown). The NWDAF 319 is a control plane function. The NWDAF 319 can collect network data and run data analytics algorithm to provide operational statistics, predictions, and recommendations to other network functions and OAM system, which is part of network management function (NMF). In some embodiments, the AMF-1 308 may also create and send GC Session messages to UE 202.

In some embodiments, the AMF-2 350 may receive GC Session messages that are to be sent to the (R)AN node 302 from the CN functions such as MSF 310, PCF 316, NWDAF 319. In some embodiments, the AMF-2 350 may create and send messages related to GC Session to the (R)AN. In some embodiments, the AMF-2 350 may receive GC Session messages from the (R)AN node 302 which the AMF-2 350 forwards to CN functions such as MSF 310, PCF 316, NEF 314, NWDAF 319, and to the OAM system of the NMF.

Figure 4A:
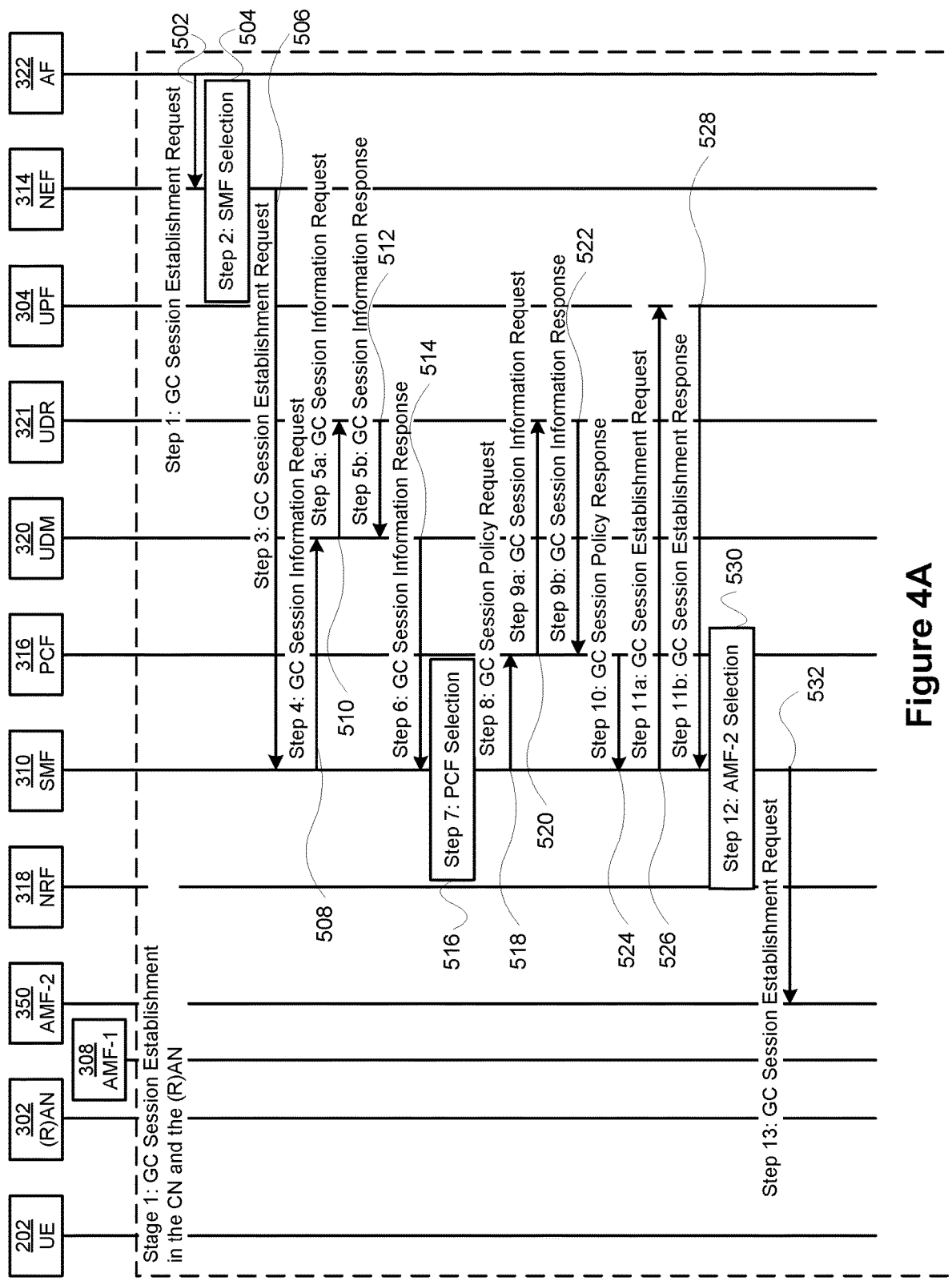
FIGS. 4A and 4B illustrates an embodiment of an GC Session establishment in the CN and (R)AN.

FIG. 4A illustrates an embodiment of GC Session establishment in the CN and the (R)AN node 302. The following are the steps of FIG. 4A.

Step 1: AF 322 may send a GC Session establishment request message 502 to NEF 314. The GC Session establishment request message 502 may include GC session information including any combination of the following information: AF Transaction ID, AF-Service-ID, External Group ID and/or Internal Group ID of UEs that receive the GC data, a list of UE IDs (such as External UE ID, or GPSI (Generic Public Subscription Identifier)), GC Session location information (or Group communication service area) (such as any combinations of one or multiple Geographical Zone IDs, one or multiple identifiers of (R)AN nodes (such as any combinations of (R)AN IDs, (R)AN IP addresses, list of cell identifiers (Cell IDs) of each (R)AN nodes), one or multiple tracking areas, one or multiple SMF service areas, one or multiple AMF service areas, one or multiple registration areas, or an indication of the whole PLMN, number of data flows, name or identifier of each data flow, QoS requirements of each data flows and/or QoS requirements of the GC Session, such as any combinations of maximum flow data rate, maximum data rate of GC session, average data rate of flow(s) and/or of GC session, packet delay budget or each flow and/or of GC session, expected or maximum data volume in a certain period of time of each flow and/or of GC session, Network Slice Information such as any combinations of S-NSSAI, DNN, Application identifier, type of data such as IP data, unstructured data, or Ethernet data, how the group communication data will be sent to the network (for example over NEF control plane or UPF user plane), AS information. The AF 322 may include a message, may be called AF-to-UE message, for the UE 202 such that the CN may transparently send to the UE 202 when the CN, such as the MSF 310, sends GC Session announcement messages to the UE 202. This step could be implemented by a new service of the NEF 314, such as, Nnef_GCSession_Create_Request that are discussed in further detailed below.

The AS information may be one or more of following information: type of data (IP data, Ethernet data, unstructured data), IP packet description or Ethernet packet description. The IP packet description may include one or more of following information: IP version (IPv4 or IPv6), source IP Addresses or IP Prefixes, source UDP or TCP port number, Type of Service (TOS) (IPv4)/Traffic class (IPv6) and Mask, Flow Label (IPv6), Security parameter index.

The Ethernet packet description may include Source MAC address, Ethertype as defined in IEEE 802.3, Customer-VLAN tag (C-TAG) and/or Service-VLAN tag (S-TAG) VID fields as defined in IEEE 802.1Q, Customer-VLAN tag (C-TAG) and/or Service-VLAN tag (S-TAG) PCP/DEI fields as defined in IEEE 802.1Q, IP Packet Filter Set, in the case that Ethertype indicates IPv4/IPv6 payload.

Step 2: The NEF 314 may perform SMF selection 504 by any one or more of the following methods:

(1) pre-configured SMF information wherein SMF selection 504 is based on GC Session information stored in the NEF 314. For example, the NEF 314 may have a mapping between GC Location information to SMF ID, or External Group ID to SMF ID, or Network Slice information to SMF ID, Application Type and/or Application ID to SMF ID, or any combination of GC information to SMF ID.

(2) The NEF 314 may request NRF 318 function to get SMF 310 information by using, for example a service of NRF 318. The NEF 314 may send the one or more of following information to NRF 318 for SMF selection 504: Network Slice Information (S-NSSAI), DNN, Internal Group ID, NF type indicating SMF function that can support GC Session management, AF-Service-Identifier (or AF Identifier), Application Identifier, Application Type (e.g. V2X application, IoT application, Video streaming application, TV broadcasting application). NRF 318 returns the SMF profiles, which may include Address information such as SMF ID, and/or SMF FQDN, and/or SMF IP Address(es), and/or SMF Endpoint Address(es). The NEF 314 may have a mapping between External Group ID and Internal Group ID and provides the NRF 319 with Internal Group ID or External Group ID.

(3) The NEF 314 may request the UDM 320 or the UDR 321 to obtain the GC Session binding information. The GC Session binding information provides a mapping between AF-Service-Identifier ID (or AF Identifier, or External Group ID) and/or network slice information (e.g. S-NSSAI) and/or DNN with SMF Address information. The UDM 320 may have SMF function information or SMF instance information that is preconfigured to serve specific AF(s)' GC Sessions.

Step 3: The NEF 314 may send a GC Session establishment request message 506 to the selected MSF 310, including the information received from the AF 322. In case the group communication data is sent to NEF 314, NEF 314 may include an uplink tunnel end point identifier (TEID) for the UPF 304 to send the message to NEF 314 for acknowledgement of successfully received data or request for retransmission of missing packets. The uplink TEID of the NEF 314 may be sent to the SMF 310 in a separate message. The GC Session establishment request may be implemented using SMF service request Nsmf_PDUSession_Create and modified as discussed below when detailed examples of operations is discussed. In some embodiments, NEF 314 includes an indication requested PDU type of GC Session such as "GC Session Type".

Note that in some embodiments, the AF 322 may be configured to send GC Session Establishment Request directly to a preconfigured the MSF 310. The AF 322 may include the same information as described in Step 1. Hence, in this embodiment, Steps 2 and 3 can be omitted.

Step 4: The SMF 310 may generate a group TMGI (Temporary Mobile Group Identity) for the UE 202 that joined the GC Session. One internal-group ID of a UE group may have multiple TMGIs, each TMGI may be used to represent different GC Session. The SMF 310 may also generate a GC Session ID. The TMGI may be also be used as GC Session ID. The SMF 310 may select a UDM 320 to get the information related to GC Session. The SMF 310 may use local information stored within SMF 310 to select a UDM 320 to serve GC Session. The SMF 310 may access NRF 318 to discover a UDM 320 by sending Nnrf_NFDiscovery_Request message. The SMF 310 may provide NRF 318 with any combination of the following to select a UDM 320: AF-Service-Identifier, Application information including Application ID, type of application (e.g. video multicast or broadcast, voice multicast or broadcast, V2X data multicast or broadcast), UE Group Information (e.g. External Group ID and/or Internal Group ID, and/or TMGI), network slice information (e.g. S-NSSAI), and DNN. After selecting a UDM 320, the SMF 310 may send a message, such as a GC Session information request message 508, to the UDM 320 to get GC Session related information. The GC Session information request message 508 may include some or all of the session information contained in the received GC Session establishment request message described in step 3. The GC Session information request message 508 may be implemented using the Nudm SDM Get service of UDM 320. The SMF 310 may request UDM 320 to provide AMF-1 308 information. The SMF 310 discovers AMF-1 308 by sending a request, for example Discover AMF-1 Request, to UDM 320. For example, SMF 310 may use the UDM Nudm_UECM_Get service. The SMF 310 may provide any combination of the following to the UDM 320: UE information including any combination of UE ID (e.g. SUPI (Subscription Permanent Identifier), or GPSI, Temporary Mobile Station Identifier (TMSI)), Internal Group ID, TMGI, and NF type (is AMF function type), and Access Type (e.g. 5G (R)AN, WiFi, 3GPP, non-3GPP). The SMF 310 may also implicitly register itself with the UDM 320 as a serving SMF function for the GC Session. Alternatively, the SMF 310 may explicitly register itself with the UDM 320 as a serving SMF function of the GC Session using Nudm_UECM_Registration service and with modification that will be discussed under detailed examples of operations below. The SMF 310 may provide GC Session ID and/or TMGI, AF-Service-Identifier, Internal Group ID, network slice information (e.g. S-NSSAI), and DNN.

In the Discover AMF-1 Request, the SMF 310 may include an indication, whether the SMF 310 wants to discover the serving AMF-1 308 of each UE 202, or only the list of AMF-1s 308 that serve the UEs 202.

Step 5*a*: Following receipt of the GC Session information request message 508 from MSF 310, the UDM 320 may send a request, for example a GC Session information request message 510, to UDR 321 to get GC Session related information. The GC Session information request message 510 may include the AF-Service-Identifier ID, External Group ID, network slice information (such as S-NSSAI), and DNN. If the UDM 320 has the mapping between External Group ID and UE Group ID (e.g. Internal-Group ID), the UDM 320 may also include the Internal-Group ID. UDM 320 may create a TMGI, if it is not created by the SMF, and also sends this information to UDR 321. The GC Session information request illustrated by step 5*a* may be implemented using the UDR 321 Nudr_DM_Query service to request GC Session management subscription data. The UDM 320 may include an AF-Service-Identifier, or Internal Group Identifier in this GC Session information request.

Step 5*b*: Following receipt of the GC Session information request message 510 from UDM 320, UDR 321 sends a GC Session information response message 512 to UDM 320. The GC Session information response message 510 may include UE Group ID (e.g. Internal-Group ID), list of UE IDs of UEs (such as SUPI, or GPSI) in the UE Group, Location Information of GC Session (e.g. Addresses of RAN nodes (otherwise referred to as RAN node addresses) and/or Cell ID(s) of the each RAN nodes, Geographic Zone ID(s)), and Network Function information if available (e.g. serving AMF ID or AMF Address, UPF ID(s) or UPF Address(es), NEF ID or NEF Address). The GC Session information response message 512 may be implemented using the UDR Nudr DM Query response.

Step 6: The UDM 320 sends a message, e.g. GC Session Information Response message 514, to the SMF 310 which includes information received from UDR 321 as described in step 5*b* or the information that already available in the UDM 320 so that the UDM 320 does not need to perform step 5*a* or does not need to obtain from the UDR 321. The UDM 320 may also send any combination of the following information to MSF 310: Internal-Group ID (if the UDM stores the Internal-Group ID) and/or the TMGI (if the UDM created group TMGI), list of UE IDs (such as GPSI or SUPI), Subscription information related to UE Group (e.g. Maximum bit rate of GC Session, Maximum traffic volume in a certain period), Network Slice Information (e.g. S-NSSAI) that may be used by the SMF 310 to select one or multiple UPF 304 to serve GC Session. The GC Session Information Response message 514 described in step 6 may be implemented by using UDR service response Nudm SDM Get. If the SMF 310 sent a Discovery AMF-1 message in step 4, the UDM 320 sends Discovery AMF-1 Response to SMF 310 to inform SMF 310 of the AMF information (such as AMF ID, or FQDN, or AMF Address). The UDM 320 may use the Nudm_UECM Get response service to send a Discovery AMF-1 Response message. The UDM 320 may either send the list of AMF ID(s) (or AMF Address(es) or FQDN(s)), or the list of mapping between UE and AMF, depending the Discovery AMF-1 Request of the SMF 310 in step 4. Some SMF and AMF instances may be configured to serve certain geographic areas called service area, and/or UE(s), and/or UE group(s), and/or application(s), and/or network slice instance(s), and/or DNN, and/or group communication service. The SMF 310 may use the UE location information provided by the UDM 320, and stored in the AMF-1 308, to select the appropriate AMF-2 350. For example, SMF 310 may request AMF-1 308 to provide the location of the UE 202 using AMF-1 308 service Namf Location ProvidePositioningInfo.

Step 7: The SMF 310 may perform PCF selection 516 according to some criteria. The additional information to perform PCF selection 516 may be AF-Service-Identifier which is used to identify AF 322 and/or AS 402.

Step 8: SMF 310 may have local policy control and charging (PCC) rules for the GC Session. The PCC rules may include similar information that may be provided by the PCF 316. The SMF 310 may send a message (e.g. GC Session Policy Request message 518) to the selected PCF 316 to get the GC Session policies. The GC Session Policy Request message 518 may include any combination of following information: an UE Group ID (e.g. Internal-Group ID and/or TMGI), AF-Service-Identifier, Network Slice Information (e.g. S-NSSAI), DNN, name(s) or identifier(s) of data flows of GC session, Application ID, Application Type. The GC Session policy request message described in step 8 may be implemented by using a Npcf_SMPolicyControl_Create Request to establish a session with the PCF 316 and get the default PCC Rules for the GC Session.

In step 8, SMF 310 may also send GC Session policy request message 518 to UDM 320 to get GC Session information such as subscribed QoS parameters, including any combinations of 5 QI, ARP, maximum flow bit rate of flow(s) and/or of GC session, and expected or maximum GC traffic volume of individual data flow(s) and/or GC session over a certain period of time. The maximum GC flow bit rate is the limit of the bit rate measured over an averaging window that the Application Server may send to the Core Network over UPF 304 or NEF 314. UDM 320 may request the GC Session information stored in UDR 321 be sent to MSF 310.

Step 9a: In order to make policy decision, the PCF 316 may send a message, e.g. GC Session Information Request message 520, to UDR 321 to get GC Session related information. The GC Session Information Request message 520 may be implemented using the Nudr UDM Query service in order to receive the GC Session information. The GC Session Information Request message 520 may also include any combination of Internal-Group ID, AF-Service-Identifier, name(s) or identifier(s) of data flows, Application Type, Application ID, Policy Data, GC Session policy control. PCF 316 may request notifications from UDR 321 about changes in the subscription information by invoking Nudr DM Subscribe. Information provided during invocation of Nudr DM Subscribe includes: Internal-Group ID, AF-Service-Identifier, Policy Data, Notification Target Address (Notification Correlation Id), Event Reporting Information (continuous reporting), GC Session policy control. This message may also include an Internal-Group ID, AF-Service-Identifier, network slice information (e.g. S-NSSAI), DNN, received in Step 8.

Step 9a is optional and is used if PCF 316 doesn't have enough information to make its policy decision.

Step 9b: Following receipt of the GC Session information request message 520 from PCF 316, UDR 321 may send a message, e.g. GC Session Information Response message 522, to PCF 316. The GC Session Information Response message 522 may contain information on GC subscription information such as: QoS requirements, charging information, and Access Type (e.g. 5G RAT or 4G RAT), UE subscription information. QoS requirements in this message may include resource type (e.g. Guaranteed Bit Rate (GBR), delay critical GBR, or non-GBR), maximum flow bit rate of individual data flow(s) and/or GC session, guaranteed flow bit rate of individual data flow(s) and/or GC session, packet delay budget, expected or maximum GC traffic volume in certain period of time. UE subscription information in this message may include Service Level Agreement, QoS policy, charging policy, traffic routing policy (Access type(s)). The GC Session Information Response message 522 may be implemented by using Nudr UDM Query response service.

Step 10: The PCF 316 may send a message, e.g. GC Session Policy Response message 524, to MSF 310. The GC Session Policy Response message 524 may include Policy and Charging Control rules for the GC Session such as policy and charging policy (PCC) information. The GC Session Policy Response message 524 may be implemented by using Npcf_SMPolicyControl_Create response service. The PCC may include QoS control, which refers to the authorization and enforcement of the maximum QoS that is authorized for a GC Session and/or service data flows in the GC Session.

The authorized QoS for a GC Session and/or a service data flow template may include a 5G QoS Identifier (5 QI). For 5 QI of GBR type, the authorized QoS for each service data flow of GC Session may include any combination the ARP (allocation and retention priority), MBR (Maximum flow bit rate), GFBR (guaranteed flow bit rate) and may include a request for notification when authorized GFBR cannot be fulfilled or can be fulfilled again. For 5 QI of non-GBR type, the authorized QoS may include the ARP and the Reflective QoS indication; if no ARP is included a default ARP applies for the service data flow template. The authorized QoS for a service data flow template may also refer to QoS characteristics.

QoS control also refers to the authorization and enforcement of the GC Session AMBR and default 5 QI/ARP combination. The PCF 316 may provide the authorized GC Session AMBR and the default 5 QI and ARP combination as part of the GC Session information for the GC Session to the MSF 310. The authorized GC Session AMBR and authorized default 5 QI/ARP values takes precedence over other values locally configured or received at the MSF 310.

Step 11a: The SMF 310 may send a GC Session establishment request message 526 to UPF 304. The GC Session establishment request message 526 may include any combination of the following information:

GC UP Information: the RAN information (IP Addresses of RAN 302 nodes, and UL TE ID if SMF can provide), DL Tunnel Endpoint ID (TEID) of each (R)AN 302 node or a common DL TEID used by all (R)AN 302 nodes if the SMF 310 assigns the DL TEID, error correction protocol for the UP tunnel connection between (R)AN 302 node and UPF 304 or between the (R)AN 302 node and the NEF 314 that RAN 302 may use;

N6 interface information, which is one or more of following information: IP Address or IP Prefix and Port number that the UPF 304 may use to communicate with the Application Server (AS) 402, packet flow description for the UPF 304 to detect packets belonging to the GC Session, transport protocol between the UPF 304 and the AS 402 in case the AS 402 sends the downlink group communication packets or files to the UPF 304;

UP information for connection between the UPF 304 and the NEF 314 in case the AF 322 sends DL GC packets or files to the NEF 314;

QoS policy, which is one or more of following information for each service data flow of GC Session: Resource Type, Maximum flow bit rate, guaranteed flow bit rate, packet delay budget for the UPF, expected or maximum group communication traffic volume in a certain period of time; and/or QoS policy for GC Session, which is one or more of following information: Resource Type, AMBR, default ARP, guaranteed bit rate, packet delay budget for the UPF, expected or maximum group communication traffic volume in a certain period of time;

Charging policy: The charging could be based on connection time, packet counting, traffic volume counting or any combinations of the charging method. The charging policy may include the indication to instruct the UPF 304 how to process the packets when the charging reaches the limit, such as the limit of connection time, and/or the limit of the number of packets, and/or the limit of traffic volume. In one embodiment, the charging policy may instruct the UPF 304 to drop the packets when the limit reaches, or to buffer the packets, or to keep sending the packets to the (R)AN 302 node(s). The UPF 304 may notify the SMF 310 when the limit is reached.

Step 11*b*: Following receipt of the GC Session establishment request message from SMF 310, the UPF 304 establishes resources to serve GC Session. The UPF 304 sends a GC Session establishment response message 528 to MSF 310. If the UPF 304 is in charge of generating TEID, the GC Session establishment response message 528 may include the UL TEID for the (R)AN node 302 to send acknowledgement message for successful packets or file receipt or request the UPF 304 or the NEF 314 to retransmit missing packets.

Step 11 may be performed before step 12 or after as described further below.

Step 12: The SMF 310 may perform AMF-2 selection 530 and the selected AMF-2 350 sends SM messages to the RAN node 302 nodes using one of the following methods: (1) AMF information that is pre-configured in MSF 310; (2) SMF 310 may obtain the AMF information from UDM 320 in step 4; (3) SMF 310 may request NRF 318 get the AMF address. In method (3), the SMF 310 may provide the NRF 318 with any combination of following information: application information (e.g. AF-Service-Identifier, and/or Application ID, and/or Application Type), Network Slice Information (e.g. S-NSSAI), Geographic location of group communication service that provided by the AF in step 1 (e.g. Geographic Zone ID(s), or (R)AN Addresses), UE information (e.g. UE IDs (such as SUPI), UE location). NRF 318 uses this information to select the AMF-2 350.

Step 13: The SMF 310 may send a GC Session establishment request message 532 to the AMF-2 350, 355. The GC Session establishment request message 532 may be implemented by using the AMF-2 service Namf_Communication N1N2MessageTransfer Request. The GC Session establishment request message 532 may include any combination of:
SMF ID;
Network Slice Information (such as S-NSSAI);
An identifier to identify the group communication, such as GC Session ID and/or TMGI; and
RAN information, such as Geographic Zone ID(s), or list of Address(es) or ID(s) of RAN 302 nodes to join the GC Session, and list of Cell IDs of each RAN 302 node.
UPF information: UPF Address and UL TEID. The UL TEID may be used by RAN node 302 to communicate with the UPF 304, such as to request UPF 304 resend missing packets or to acknowledge the successful reception of packets or files;
UE Information: Internal Group ID, TMGI, List of UE IDs (such as SUPI, GPSI, or 5G Globally Unique Temporary Identifier (5G GUTI)), or any UEs in case of broadcast session;
QoS Profile for GC Session, which may include QoS Profiles for Service data flows. Each service data flow of GC Session may have a separate QoS Profile. The QoS Profile for each service data flow may have one or more information:

a 5G QoS Identifier (5 QI),
an Allocation and Retention Priority (ARP).
For each GBR QoS Flow, the QoS profile shall also include the QoS parameters:
Guaranteed Flow Bit Rate (GFBR) in downlink (DL); and
Maximum Flow Bit Rate (MFBR) in DL; and
In the case of a GBR QoS Flow only, the QoS parameters may also include:
Notification control.
Maximum Packet Loss Rate
The QoS Profile for the GC Session may include any combination of QoS Profile(s) of Service Data Flow(s), GC Session-AMBR, default ARP for GC Session, Default 5 QI, guaranteed bit rate of GC Session, packet delay budget of GC Session, expected or maximum GC traffic volume in a certain period of time. In case there is only one service data flow, the QoS Profile of GC Session may not have QoS Profile of service data flow.
Error Correction protocol in the interface connecting (R)AN node 302 and UPF 304. The (R)AN node 302 uses this tunnel to request retransmission of missing PDU packets;

In step 13, the SMF 310 may send information to the AMF-2 350. The AMF-2 350 may create multiple N2 mobility management (MM) message from the information receive from SMF 310. The AMF-2 350 may then send each N2 MM message to each (R)AN node 302. Alternatively, SMF 310 may send multiple N2 SM messages, each message has one (R)AN ID (or Address, FQDN) for one (R)AN node 302. The AMF-2 350 later will forward each N2 SM message to the (R)AN node 302.

In step 13, the SMF 310 may send Geographic Zone ID(s) to the AMF-2 350. The AMF-2 350 may have locally stored information to map the Geographic Zone ID to the (R)AN address(es). Alternatively, the AMF-2 350 may send a request to the UDM 320 to get the mapping between Geographic Zone ID to the (R)AN address(es) and may also include the list of Cell ID(s) of each (R)AN node that join the GC Session. Alternatively, if the SMF 310 provides a list of UE IDs (such as SUPI, or GPSI), the AMF-2 350 may use a service Nudm SDM Get of UDM 320 to get the last known location of the UE 202. The UE location may be represented by, for example, the (R)AN ID or cell ID of (R)AN node 302, and may be stored in the UDR. The UDM 310 may use a service Nudr_DM_Query to get the last known location of UE 202.

Figure 4B:
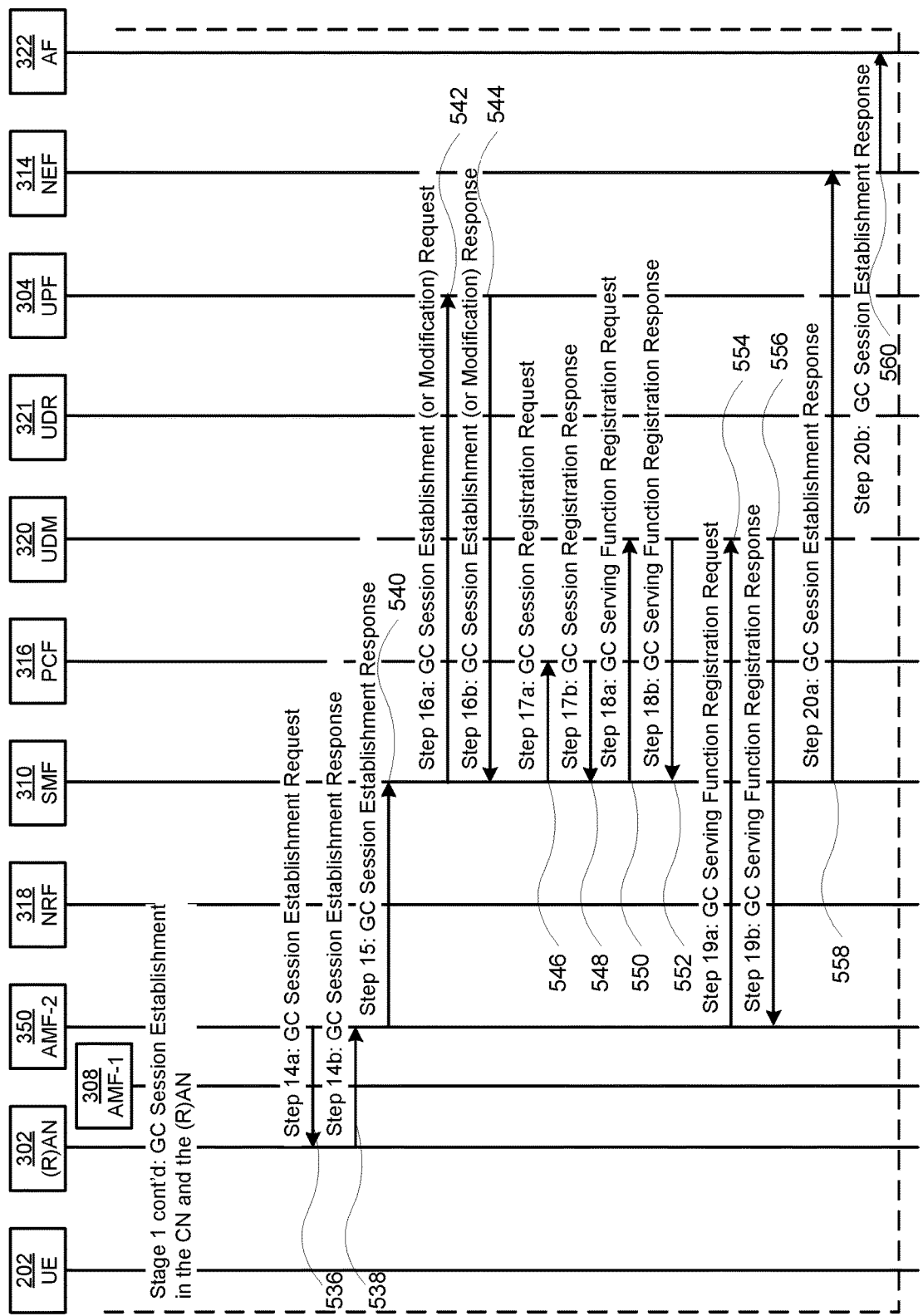

FIG. 4B illustrates an embodiment of an GC Session establishment in the CN and (R)AN. The following are the steps of FIG. 4B and the steps relate to the architectures shown in FIG. 2 and FIG. 3.

Step 14*a*: the AMF-2 350 may create an N2 control channel between the AMF-2 350 and each (R)AN node 302 that is included in step 13. This N2 control channel is used to exchange control signaling including the internal Group ID and/or GC Session ID, and/or TMGI. The AMF-2 350 may forward the GC Session establishment request message 536 to (R)AN node 302. The AMF-2 350 may request (R)AN node 302 establish a control channel between the AMF-2 350 and (R)AN node 302 to exchange signaling information.

Step 14*b*: If the resource type is a Guaranteed Bit Rate (GBR), RAN node 302 may respond to the GC Session Establishment Request message 536 from the AMF-2 350 by reserving radio resources for the GC Session according to the QoS Profile of GC Session. Each (R)AN node 302 then sends a GC Session establishment response message 538 to the AMF-2. The GC session establishment response message 538 may include DL TEID in case (R)AN node 302 is in charge of assigning DL TEID.

If the AMF-2 350 sent N2 MM message to carry GC Session establishment request message 536 in step 14*a*, (R)AN node 302 sends an N2 MM response message in step 14*b* to carry GC Session establishment response message 538.

If SMF 310 sent N2 SM message to carry GC Session establishment request message 536 in step 14*a*, the (R)AN node 302 sends an N2 SM response message in step 14*b* to carry GC Session establishment response message 538.

If the (R)AN node 302 does not have resource for GC Session using a multicast and/or broadcast radio channel, the (R)AN node 302 may indicate in the GC session establishment response message 538 the unavailability of the multicast and/or broadcast radio channel. The (R)AN node 302 may use unicast radio channel (such as DRB) to send GC data to the UEs 202. The (R)AN node 302 may include (R)AN information (such as TEID(s) of N3 interface, each corresponds to the unicast radio channel(s) and (R)AN address) in the GC session establishment response message 538 in step 14*b*. Alternatively, the (R)AN node 302 may include only one common TEID for the N3 interface for the UPF 304 to send GC data to the (R)AN node 302; the (R)AN node 302 may distribute the GC data received from the N3 interface and distributes over multiple unicast radio bearers to multiple UEs.

Step 15: The AMF-2 350 sends a GC Session establishment response message 540 to the MSF 310. The AMF-2 350 may use Nsmf_PDUSession_UpdateSMContext_Request with additional information elements to deliver the GC session establishment response message 538 received from (R)AN node 302. If the DL TED is included in the GC Session establishment response message 538 received from (R)AN node 302, the SMF 310 sends a GC Session establishment or modification request message 52 to UPF 304 to provide the DL TEID.

Step 16*a*: If step 11*a* has not been performed, the SMF 310 may send a GC Session establishment request message (illustrated as GC Session establishment (or modification) message 542 in FIG. 4B) to UPF 304. If step 11*a* has been performed, the SMF 310 may send a GC Session modification request message (illustrated as GC Session establishment (or modification) message 542 in FIG. 4B) to the UPF 304. The GC Session establishment message or the GC Session establishment modification message may include any combination of the information as described for GC Session establishment request message 532 in step 11*a*. If the (R)AN provided the DL TEID(s) in GS Session establishment response message 538, the SMF 310 also sends in GC Session establishment or modification request message 542 the DL N3 tunnel information, which include (R)AN Address(es) or (R)AN ID(s), or (R)AN FQDN(s), and corresponding DL TEID(s) of (R)AN node(s).

Step 16*b*: Following receipt of the GC Session establishment or modification request message 542 from MSF 310, the UPF 304 establishes or modifies resources to serve the GC Session. The UPF 304 may send a GC Session establishment or modification response message 544 to the MSF 310.

Step 17*a*: SMF 310 may send a GC session registration request message 546 to the PCF 316 to initiate a GC Session registration process with the PCF 316 to activate a mapping between GC Session ID and UE Group ID (e.g. Internal Group ID, TMGI), or a mapping between the IP Address/ Prefix that was assigned to the UPF 304 in step 11*a* and/or step 16*a*. This mapping is used for the PCF 316 to update dynamic policy control for SMF 310 to control the GC Session policies. The GC Session registration request message 546 may be implemented using Npcf_SMPolicyControl_Update_Request service of PCF 316 with modification discussed under detailed examples of operations below.

Step 17*b*: The PCF 316 may send a GC Session registration response message 548 to SMF 310 to confirm the reception of the GC session registration request message 546 in step 17*a*. The GC Session registration response message 548 may be implemented using the PCF 316 service Npcf_SMPolicyControl_Update Response with modification discussed under detailed examples of operations below.

Step 18*a*: The SMF 310 may also send a GC severing function registration request message 550 to initiate a registration process with UDM 320 to register itself as a serving SMF function for the GC Session ID. This registration may be performed if not done in Step 4. The SMF 310 may use Nudm_UECM_Registration Request service with modification discussed under detailed examples of operations below. The SMF 310 may include one or more of following parameters in its Nudm_UECM_Registration Request: SMF ID, Internal Group ID, TMGI, GC Session ID, List of UE IDs (such as SUPI, GPSI). The UDM 320 use the provided information for later communication if the UDM 320 wants to update GC Session data to the MSF 310.

Step 18*b*: The UDM 320 may send a GC serving function registration response message 552 to SMF 310 that is similar to the GC Session Information Response message 514 sent in step 6. In some embodiments, the Nudm_UECM_Registration Response service with modification discussed under detailed examples of operations below may be used to send the GC serving function registration response message 552.

Step 19*a*: The AMF-2 350 may send a GC service function registration request message 554 to UDM 320 to initiate a registration process with UDM 320 to register itself as a serving AMF function for the GC Session. The AMF-2 350 may use Nudm_UECM_Registration Request service with modification discussed below when detailed examples of operations are discussed. The AMF-2 350 may include one or more of following parameters in its Nudm_UECM_Registration Request: AMF ID (or AMF IP address), Internal Group ID, TMGI, GC Session ID, List of UE IDs (such as SUPI, GPSI), GC Session Location(s) that the AMF-2 350 serves UEs.

Step 19*b*: UDM 320 may send a GC serving registration response message 556 to the AMF-2 350. In some embodiments, the Nudm_UECM_Registration Response service with modification discussed under detailed examples of operations below may be used to send the GC serving registration response message 556.

Step 20*a*: The SMF 310 may confirm the completion of GC Session establishment process by sending GC Session Establishment Response message 558 to the network function that sent the GC Session establishment request message 508 in Step 3. In case the NEF 314 is used for the AF 322 or AS 402 to send GC data to the UEs 202, the NEF 314 may send the GC session establishment request based on the GC Session request from the AF 322, the SMF 310 may include AF-Service-ID, AF Transaction ID, Internal Group ID, GC Session ID and/or TMGI, UPF information such as UPF Address(es) and DL TEID for the NEF to send DL packets to the UPF(s), UPF information for the AS 402 to send DL GC data to the UPF 304.

If GC Session carries IP traffic: the UPF information may include any combination of IP version (IPv4 or IPv6), source IP Addresses or IP Prefixes, source UDP or TCP port number, Type of Service (TOS) (IPv4)/Traffic class (IPv6) and Mask, Flow Label (IPv6), Security parameter index. The Ethernet packet description may include Source MAC address, If GC Session carries Ethernet traffic: the UPF information may include any combination of Ethertype as defined in IEEE 802.3, Customer-VLAN tag (C-TAG) and/or Service-VLAN tag (S-TAG) VID fields as defined in IEEE 802.1Q, Customer-VLAN tag (C-TAG) and/or Service-VLAN tag (S-TAG) PCP/DEI fields as defined in IEEE 802.1Q, IP Packet Filter Set, in the case that Ethertype indicates IPv4/IPv6 payload.

In some embodiments, the Nsmf PDUSession Create Response service of the SMF 310 and modified as discussed under detailed examples of operations below may be used to send the GC Session Establishment Response message 558.

Step 20*b:* If the SMF 310 provided Internal Group ID in step 20*a*, the NEF 314 may map Internal Group ID to External Group ID. The NEF 314 may then confirm the completion of the GC Session establishment process by sending a GC Session establishment response message 560 to AF 322 that sent the GC Session establishment request message 502 in Step 1. The NEF 314 may include any combination of following information: AF-Service-ID, AF Transaction ID, External Group ID, GC Session ID and/or TMGI, UPF or NEF information, such as IP Address(es) UDP port number, data transmission protocol (e.g. HTTP) in this message. In some embodiments, the NEF service Nnef PDUSession Create Response (or in other words Nnef GCSession Create Response) as described under detailed examples of operations. The AF 322 uses the UPF 304 (or NEF 314) information to send GC data towards the UEs 202 may be used to send the GC Session establishment response message 560. The AF 322 may subscribe explicitly or implicitly to the event exposure service of NEF 314 for notifications related to the GC Session. The AF 322 may provide the NEF 314 with one or more of following information; AF Transaction ID, External Group ID, GC Session ID, TMGI, the set of Event IDs, e.g. GC Session Status, which indicates whether UEs 202 have received GC Session announcement as well as the reason (cause) if UE 102 has not received GC Session announcement. The NEF 314 may subscribe to event exposure service of SMF 310 related to the GC Session. NEF 314 may provide Internal Group ID, the set of Event IDs, e.g. GC Session Status, which indicates whether UEs 202 have received GC Session announcement and the reason (cause) if UE 202 has not received GC Session announcement.

Note that the GC Session announcement procedure is described in a separate procedure later. This procedure could be performed a time, for example after the SMF 310 received the message 506, or after the SMF 310 received message 540.

An alternative method in steps 13, 14*a*, 14*b*, and 15, for SMF 310 to configure SM Session Context in (R)AN node 302 is as follows. Step 13: The SMF 310 sends an N11 GC Session Establishment Request message to the AMF-2 350. The N11 GC Session Establishment Request message may contain similar information that are described in step 13, for example the list of (R)AN Addresses, QoS information, UPF information (e.g. Address of UPF, and UL TEID for each (R)AN node), DL TEID of GC Session, UE Group ID (e.g. Internal-Group ID, and/or TMGI), UE information (such as UE IDs, like SUPI or GPSI), GC Session ID which could be represented by TMGI, Network Slice Information (e.g. S-NSSAI). Step 14*a:* The AMF-2 350 may discover the locations of UEs 202, such as the serving (R)AN information, such as (R)AN IDs, or (R)AN addresses. Step 14*b:* The AMF-2 350 may create an N2 control channel between the AMF-2 350 and each (R)AN node 302 that is included in step 13 to exchange control signal for the UE Group ID, and/or for GC Session ID. The AMF-2 350 may create multiple N2 MM GC Session Establishment Request messages, each of N2 MM GC Session Establishment is sent to one (R)AN node 302. The N2 MM GC Session establishment request messages may include any combination of the information received in Step 13. Step 14*c:* If it is a Guaranteed Bit Rate (GBR) resource type, the (R)AN may reserve radio resources for the GC Session according to the QoS Profile of GC Session. Step 15: Each of (R)AN nodes 302 then may send an N2 MM GC Session establishment response message to the AMF-2 350. The GC Session establishment response message may include DL TEID in case the (R)AN 702 is in charge of assigning DL TED. If the (R)AN 702 assigned a multicast data radio bearer or a broadcast radio bearer for the GC Sessions, the DL TED may be the TEID of one DL tunnel. Otherwise, the (R)AN 702 may assign multiple DL TEID, each DL TED for one N3 interface for one UE so that the UPF may send use multiple unicast transmissions for GC Session. The AMF-2 350 may collect all the N2 MM GC Session establishment response message, and may forward GC Session information received in step 14*b* to the MSF 310.

Figure 5:
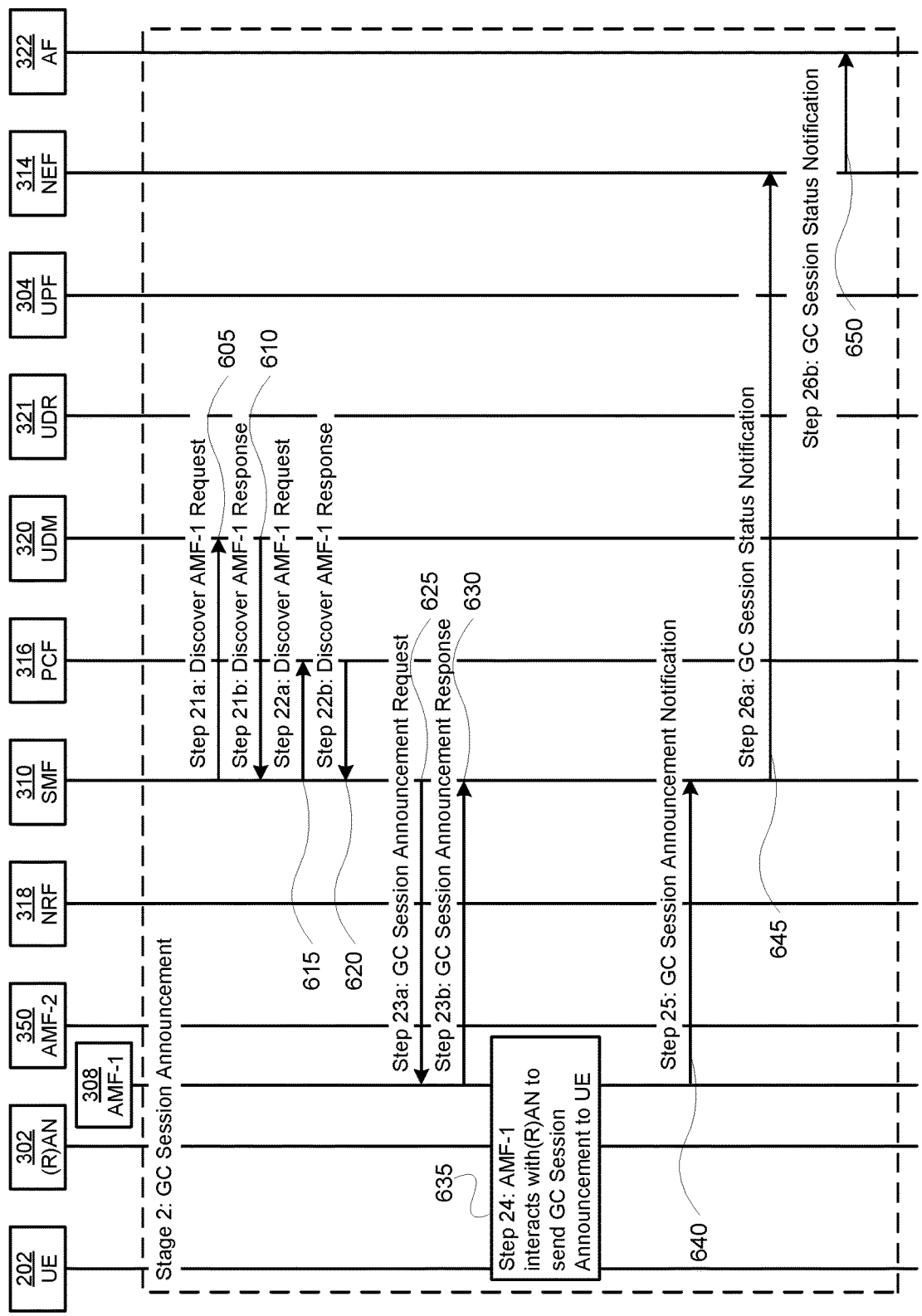
FIG. 5 illustrates an embodiment of an AMF-1 GC Session announcement.

FIG. 5 illustrates an embodiment of an AMF-1 308 GC session announcement. The following are the steps of FIG. 5. The steps described are for the architecture illustrated in FIG. 2.

AMF-1 308 is the AMF that serves unicast PDU Session(s) of UEs 202. Either step 21 or 22 may be used for SMF 310 to discover AMF-1 308. There can be multiple AMF-1s 308, each AMF-1 308 may serve one or multiple UE 202s that are targeted to receive group communication data.

Step 21*a:* The SMF 310 may discover AMF-1 308 by sending a request, for example Discover AMF-1 Request message 605, to UDM 320. For example, the SMF 310 may use the UDM service Nudm_UECM Get. SMF 310 may provide any combination of following information to UDM 320: UE information (such as UE ID (e.g. SUPI), Internal Group ID, TMGI), and NF type (is AMF function type), and Access Type (e.g. 5G (R)AN, WiFi, 3GPP, non-3GPP).

Step 21*b:* The UDM 320 may send a Discovery AMF-1 Response message 610 to SMF 310 to provide the AMF ID or AMF Address, or AMF FQDN. UDM 320 may use Nudm_UECM Get response service to send Discovery AMF-1 Response message 610.

Step 22*a:* The SMF 310 discovers AMF-1 308 by sending a request, for example Discover AMF-1 Request message 615, to the PCF 316. The SMF 310 may provide one or more of following to PCF 316: UE information (such as UE ID (e.g. SUPI, GPSI, TMSI), Internal Group ID, TMGI), and NF type (is AMF function type), and Access Type (e.g. 5G (R)AN, WiFi, 3GPP, non-3GPP).

Step 22*b:* The PCF 316 may send a Discovery AMF-1 Response message 620 to SMF 310 to provide the AMF ID or AMF Address, or AMF FQDN.

Step 23*a:* The SMF 310 may send GC Session Announcement Request message 625 to AMF-1 308. In some embodiments, the SMF 310 may use service Namf_Communication_N1N2 Message Transfer and modified as discussed under detailed examples of operations below to send the GC Session Announcement Request message 625 to AMF-1 308. The GC Session Announcement Request message 625 may include any combinations of the following information:

GC Session Information:
GC Session ID: The GC Session Identifier that created by the SMF 310 in step 4. The GC Session ID may be also a TMGI created by the SMF 310 in step 4, or by the UDM 320 sent to the SMF 310 in message 514.
TMGI
ARP: paging priority
Internal Group ID: The internal group ID of UE 104s that may receive the GC data.
GC service area (or GC location information): The area of GC Session, may be indicated by the list of (R)AN nodes IDs (or (R)AN IP Address, or (R)AN FQDNs) and list of cell IDs of each (R)AN node 302, tracking area ID, Registration area ID, service area of SMF 310, geographic zone ID(s). If UE 202 is currently outside the Group communication service area, the AMF-1 308 may not need to send the GC Session Announcement message to UE 202.
N1 SM message: The N1 SM message to be sent to UE 202. N1 SM message in a Message Container to the UE 202 via AMF-1 308.

The N1 SM message may contain any combination of the following information:
GC Session ID
TMGI
Time to start GC Session
Amount of data UE 202 may expect to receive
Security information: The group communication data may be protected by some measures, such as encryption at the data source. AF 322 may send the security information (e.g. including decryption key(s)) to NEF 314 in step 1 of FIG. 4A; The AF 322 may send security information of GC Session to the NEF 314. The NEF 314 may forward the security information to SMF 310 in step 3 of FIG. 4A.
QoS Information: may include QoS Rule; or some QoS parameters of the QoS Rule for each data flow and/or QoS Rule for GC Session, such as Maximum Bit Rate in the downlink, Resource Type (e.g. GBR, non-GBR, delay critical GBR), Guaranteed Flow Bit Rate (GFBR), Maximum Flow Bit Rate (MFBR), GC Session-Aggregate Maximum Bit Rate (Session-AMBR).
A data container that transparently carries an AF-to-UE message sent from the AF 322 to the UEs 202.

The SMF 310 may subscribe to Event Exposure service of the AMF-1 308 to receive UE 202 Reachability Status notification. SMF 310 receives this UE 202 reachability information by sending a Namf_EventExposure_Subscribe message to the AMF-1 308 in step 3. Alternatively, the SMF 310 may be implicitly subscribed to receive to receive UE Reachability Status notification over the Event Exposure service of the AMF-1 308.

Step 23*b*: The AMF-1 308 may send GC Session Announcement Response message 630 to the SMF 310 to acknowledge reception of message from SMF 310 in step 3*a* described above. AMF-1 308 may use Namf_Communication_N1N2 Message Transfer response service to transfer the GC Session Announcement Response message 630 to the MSF 310. Namf_Communication_N1N2 Message Transfer response service is discussed under detailed examples of operations below. AMF-1 308 may store the information receive from SMF 310 in the UE Context such as GC Session ID, an GC Session indication for GC Session ID, Internal Group ID, Group communication service area.

Step 24: the AMF-1 308 interacts 635 with (R)AN node 302 to send GC Session Announcement to UE 202.
If the UE 202 is in CM-CONNECTED state in the access associated with the GC Session, the AMF-1 308 sends the N1 SM message to the UE 202.
If the UE 202 is in CM-IDLE state in 3GPP access, the AMF-1 308 may decide to notify the UE 305 through 3GPP (R)AN even when the UE 202 is in CM-CONNECTED state for non-3GPP access, the AMF-1 308 may send a Paging message to (R)AN node(s) 302 via 3GPP access.
If the UE 202 is simultaneously registered over 3GPP and non-3GPP accesses in the same PLMN, the UE 202 is in CM-IDLE state in both 3GPP access and non-3GPP access, the AMF-1 308 sends a Paging message with associated access "non-3GPP" to NG-RAN node(s) via 3GPP access.
If the UE 202 is in RM-REGISTERED state and CM-IDLE and reachable in 3GPP access, the AMF-1 308 sends a Paging message (NAS ID for paging, Registration Area list, Paging DRX length, Paging Priority indication, access associated to the GC Session) to (R)AN node(s) 302 belonging to the Registration Area(s) in which the UE 202 is registered, then the (R)AN node 302 pages the UE 202.
If the UE 202 is in CM-CONNECTED and RRC-inactive state, the paging strategies may be configured in the (R)AN node 302 for different combinations of Paging Policy Indication, ARP and 5 QI.
If the UE 202 is simultaneously registered over 3GPP and non-3GPP accesses in the same PLMN, and the UE 202 is in CM-CONNECTED state in 3GPP access and the GC Session is associated with non-3GPP access, the AMF-1 308 sends a NAS Notification message containing the non-3GPP Access Type to the UE 202 over 3GPP access and sets a Notification timer. Step 5 is omitted.
If the UE 202 is simultaneously registered over 3GPP and non-3GPP accesses in the same PLMN, and the UE 202 is in CM-CONNECTED state for non-3GPP access and in CM-IDLE for 3GPP access, and if the GC Session is associated with 3GPP access network, and based on local policy the AMF-1 308 decides to notify the UE 202 through non-3GPP access, the AMF-1 308 may send the N1 SM message to the UE 202 over non-3GPP access network.

The (R)AN node 302 may send a message over a radio resource control (RRC) channel to inform UEs 202 of the radio resource parameters to be used for the GC Session. The radio resource parameters may include any combination of the following: data radio bearer (DRB) information, security key(s) to decrypt the data encrypted by the (R)AN node, information to identify the GC Session (e.g. TMGI, GC Session ID).

Step 25: The AMF-1 308 may send a GC Session Announcement Notify message 640 to SMF 310 to inform SMF 310 whether the GC Session Announcement has been successfully delivered to UE 202 or not. In some embodiments, the AMF service Namf_EventExposure_Notify is modified as discussed under detailed examples of operations below may be used to send the GC Session Announcement Notify message 640. The AMF-1 308 may also notify whether the UE 202 is outside GC Session service area.

Step 26*a*: The SMF 310 may collect all notification messages from one or more AMF-1s 308 for all UE 202s that are targeted to receive group communication data. The SMF 310 may send a GC Session Status Notification message 645 towards AF 322, via NEF 314. In some embodiments, the SMF 310 may collect all notification messages from one or more AMF-1s 308 for all UE 202s that are targeted to receive group communication data using Nsmf_EventExposure_Notify service of the MSF 310. The SMF 310 may include the list of UE IDs (such as GPSI, External UE IDs, SUCI, 5G GUTI, SUPI) that may join or may not join the GC Session and the reason (or cause) and also the Internal Group ID and/or TMGI. The reason could be UE 202 is outside of the region that has the GC Session, UE 202 is not reachable, UE 202 is de-registered, UE 202 ID is not valid.

Step 26b: The NEF 314 may forward the GC Session Status Notification message 645 receive from the SMF 310 in step 26a to AF 322. NEF 314 may use the Nnef_EventExposure_Notify service and modified as discussed under detailed examples of operations below to deliver the GC Session Status Notification 650 to AF 322. NEF 314 may replace some types of UE 202 ID, for example SUCI, 5G GUTI, SUPI to GPSI. NEF 314 may replace Internal Group ID with External Group ID.

An alternative to Step 21 is wherein the SMF 310 may discover AMF-1 308 in step 22.

Figure 6:
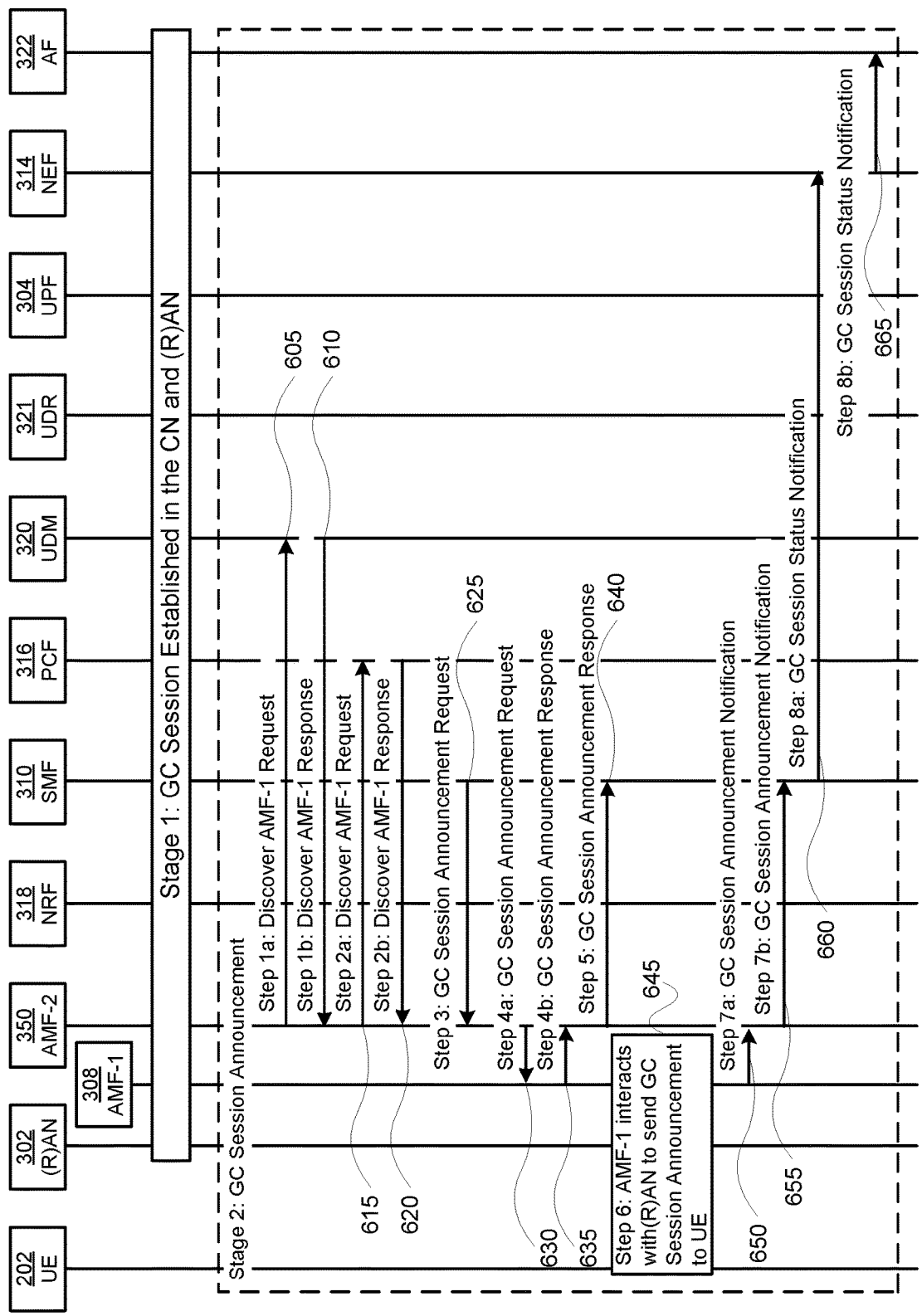
FIG. 6 illustrates an embodiment of an AMF-2 GC Session announcement.

FIG. 6 illustrates an embodiment of the GC session announcement. The following are the steps of FIG. 6.

Stage 1: The CN establishes a GC Session in the CN and (R)AN as described with respect to FIG. 4A and FIG. 4B above. In this stage, the SMF 310 does not require message exchanges with AMF-1 308. The AF 322 may subscribe to event exposure service of the NEF 314 for notifications related to the GC Session. The AF 322 may provide External Group ID, the set of Event IDs, e.g. GC Session Status, which indicates whether UEs 202 have received GC Session announcement and reason (cause) if the UEs 202 have not received GC Session announcement. The NEF 314 may subscribe to event exposure service of the MSF 310, related to the GC Session. The SMF 310 may provide Internal Group ID, the set of Event IDs, e.g. GC Session Status, which indicates whether UEs 202 have received GC Session announcement and reason (cause) if the UEs 202 have not received GC Session announcement.

In FIG. 4A, during GC Session Establishment Request 532, if the SMF 310 does not provide the list of (R)AN Address(es), the AMF-2 350 may discover the location of UE 202, such as the serving (R)AN node 302 information, such as (R)AN IDs, or (R)AN addresses by first discovering the serving AMF-1 308, which uses the same method described above with respect to FIG. 5 (e.g. the SMF 310 sends a Discover AMF-1 Request message 605 to the UDM 320 and receives a Discover AMF-1 Response message 610 from the UDM 320, or the SMF 310 sends a Discover AMF-1 Request message 615 to the PCF 316 and receives a Discover AMF-1 Response message 620 from the PCF 316 as shown in FIG.5). After discovering AMF-1 308, the AMF-2 350 may send a message, such as UE 202 serving RAN information request to the AMF-1 308. The AMF-2 350 may provide one or more of following to AMF-1 308: Internal Group ID, TMGI, UE ID (such as SUPI, GPSI, TMSI).

The AMF-1 308 may send a message, such as UE 202 serving RAN information response to the AMF-2 350, to inform the AMF-2 350 of the serving (R)AN node's 302 information.

If the AMF-2 350 provided the Internal Group ID, the AMF-1 308 searches UE Context of UEs 202 having the Internal Group ID for (R)AN Address (such as (R)AN ID, or (R)AN IP Address, or (R)AN FQDN).

The AMF-1 308 sends the list of (R)AN Address(es) that are serving UEs of Internal Group ID to the AMF-2 350. The list of (R)AN address(es) may include an indication to show which (R)AN node is serving which UEs.

If the AMF-2 350 provided the list of UE ID, AMF-1 308 searches UE Context of UEs 202 to find the serving (R)AN Address. The AMF-1 308 sends the list of (R)AN Address(es) that are serving UEs 202 to the AMF-2. The list of (R)AN address(es) may include an indication to show which (R)AN node is serving which UEs.

UE 202 serving RAN information request and response may be implemented using AMF service Namf Location ProvidePositioningInfo with modifications discussed under detailed examples of operations below. If UE 202 is in RRC-Inactive state, the AMF-1 308 may send a message to (R)AN node 302 to find the current serving (R)AN node 302 of UE 202.

In GC Session Announcement stage, the GC Session announcement Request 625 is sent from the SMF 310 to the AMF-2 350.

Step 1a: The AMF-2 350 was selected in Stage 1 to establish GC Session. If the AMF-2 350 did not discover AMF-1 308 in Stage 1, the AMF-2 350 discovers the AMF-1 308 by sending a request, for example Discover AMF-1 Request message 605, to the UDM 320. For example, the AMF-2 350 may use Nudm_UECM_Get service of the UDM 320. The AMF-2 350 may provide one or more of following information: Internal Group ID, UE ID(s) of UE(s) 202 in the UE group, (e.g. SUPI, or GPSI) and NF type (is AMF function type), and Access Type (e.g. 5G (R)AN, WiFi, 3GPP, non-3GPP) to the UDM.

Step 1b: The UDM 320 sends Discovery AMF-1 Response message 610 to the AMF-2 350 to inform the UDM 320 of the AMF ID or AMF Address of AMF-1. The UDM 320 may use Nudm_UECM_Get response service to send Discovery AMF-1 Response message 610.

Alternative to Steps 1a and 1b, the AMF-2 350 may discover AMF-1 308 in steps 2a, and 2b.

Step 2a: One AMF-2 350 was selected in Stage 1 to establish GC Session. The AMF-2 350 discovers the AMF-1 308 by sending a request, for example Discover AMF-1 Request message 615, to the PCF 320. The AMF-2 350 may provide any combination of following information: Internal Group ID, UE ID(s) of UE group (e.g. SUPI, or GPSI) and NF type (is AMF function type), and Access Type (e.g. 5G (R)AN, WiFi, 3GPP, non-3GPP) to the PCF.

Step 2b: The PCF 316 may send Discovery AMF-1 Response message 620 to the AMF-2 350 to inform the AMF ID or AMF Address of AMF-1 308.

Steps 1a, 1b or steps 2b, 2b are shown in FIG. 6 being perform before step 3, however, in alternative embodiments, steps 1a, 1b or steps 2b, 2b may be performed after step 3.

Step 3: The SMF 310 may send GC Session announcement request message 625 to the AMF-2 350. In some embodiments, the SMF 310 may send a GC Session Announcement request using Namf_Communication_N1N2MessageTransfer request service of the AMF-1 308 and modified using detailed examples of operations discussed. The GC Session announcement request message 625 may include any combinations of the following information as described in message 625 of step 23 of FIG. 5 above:

The SMF 310 may subscribe to Event Exposure service of the AMF-2 350 by sending Namf_EventExposure_Subscribe message to the AMF-2 350 in step 3 to receive UE Reachability Status notification. Alternatively, the SMF 310 may be implicitly subscribed to receive Event Exposure service of the AMF-2 350 to receive UE Reachability Status notification. The AMF-2 350 may store the information received from SMF 310 in the UE Context such as GC Session ID, an GC Session indication for GC Session ID, Internal Group ID, TMGI, Group communication service area (or GC location information).

Step 4*a*: The AMF-2 350 may send a GC session announcement request message 630 that includes the GC session announcement request message 625 received from the SMF 310 to AMF-1 308. In some embodiments, there can be multiple AMF-1s 308, the AMF-2 350 sends to each AMF-1 308 the GC Session announcement request message 625 received from the SMF 310. The GC session announcement request message 630 may include GC Session information and the N1 SM message. In some embodiments, AMF-2 350 use a Namf_Communication_N1N2MessageTransfer request service of the AMF-1 308 to deliver a GC Session announcement request message 630. The AMF-2 350 may not modify the message received from the MSF 310, just forwards the message receives from the SMF 310 to the AMF-1 308. The AMF-2 350 may also include the SMF ID of the SMF 310 and/or the AMF ID of the AMF-2 350 when sending the message received from the SMF 310 to the AMF-1 308. Later, the AMF-1 308 may use the provided AMF ID of the AMF-2 350 or SMF ID of the SMF 310 to send notification message related to the GC Session to the SMF 310 and/or the AMF-2 350. The AMF-2 350 may store the GC Session information received from SMF 310 in the UE Context, and/or UE Group Context, and/or GC Session context, such as GC Session ID, a GC Session indication for GC Session ID, Internal Group ID, TMGI, Group communication service area. The AMF-2 350 may subscribe, on behalf of the SMF, to the notification service of the AMF-1 308 related to the GC Session. In this way, the SMF 310 may receive notification messages from the AMF-1 directly.

Step 4*b*: The AMF-1 308 may send GC PDU Session Announcement Response message 635 to the AMF-2 350 to acknowledge the reception of the GC PDU session announcement request message 630 from the AMF-2 350 in step 4*a*. The AMF-1 308 may use Namf_Communication_N1N2MessageTransfer response service to transfer the GC Session Announcement Response message 630 to the AMF-2 350. The AMF-1 308 may store the GC Session information received from the AMF-2 350 in the UE Context, and/or UE Group Context, and/or GC Session context, such as GC Session ID, a GC Session indication for GC Session ID, Internal Group ID, TMGI, Group communication service area.

Step 5: The AMF-2 350 may send GC Session Announcement Response message 640 to the SMF 310 to acknowledge the reception of the GC Session announcement request message 625 from the SMF 310 in step 3. The AMF-2 350 may use Namf_Communication_N1N2MessageTransfer response service to transfer the GC Session Announcement Response message 640 to the MSF 310.

Step 6: The AMF-1 308 is configured to interact 645 with (R)AN node 302 to send GC Session Announcement to the UE 202. For example, this step is the same as step 24 of FIG. 5, the AMF-1 308 interacts with (R)AN node 302 to send GC Session Announcement to UE 635 of FIG. 5.

Step 7*a*: The AMF-1 308 may send a message, such as a GC Session Announcement Notification message 650 towards the SMF 310 either directly or via the AMF-2 350 to inform the SMF 310 whether the GC Session Announcement has been successfully delivered to the UE 202 or not. In some embodiments, the AMF-1 308 can inform the SMF 310 whether the GC Session Announcement has been successfully delivered to the UE 202 or not by using Namf_EventExposure_Notify service of the AMF-1 308 or by using Namf_Communication_N1_MessageNotify service of the AMF-1 308. The AMF-1 308 may also notify whether the UE is outside Group communication service area, and/or error (for example UE not reachable, UE deregistered, UE in extended Discontinuous Reception (eDRX) mode, UE in power saving mode).

Step 7*b*: The AMF-2 350 may forward the GC Session Announcement Notify message 655 received from the AMF-1 308 to the SMF 310 to inform SMF 310 whether the GC Session Announcement has been successfully delivered to the UE 202 or not. In some embodiments, the AMF-2 350 may inform SMF 310 whether the GC Session Announcement has been successfully delivered to the UE 202 or not using Namf_EventExposure_Notify service of the AMF-2 350. The AMF-1 308 may also notify whether the UE 202 is outside Group communication service area.

Alternative to step 7*a* and 7*b*, the AMF-1 308 may send GC Session Announcement Notification message 665 to the SMF 310 directly if the SMF ID of the SMF 310 is provided by the AMF-2 350 in step 4*a*, or the SMF 310 was subscribed to receive the notification related to the GC Session in step 4*a*.

In step 7*b*, the AMF-2 350 may forward individual messages received from AMF-1 308 to the MSF 310. In another embodiment, the AMF-2 350 may wait to collect all the notification messages from all the AMF-1 308. The AMF-2 350 may forward all the notification messages from the AMF-1 to the SMF. In another embodiment, the AMF-2 350 may extract the information from the AMF-1(s) 308 and make an GC Session Announcement Notification message that include the extracted information received from the AMF-1 308 and sends to the MSF 310.

The GC Session Announcement Notification message 665 may include any combination of following information. The list of UE IDs (e.g. SUPI, GPSI, 5G GUTI) which have received GC Session announcement message. As well, the list of UE IDs (e.g. SUPI, GPSI, 5G GUTI) which have not received GC Session announcement message; For each UE that has not received GC Session announcement message, a cause code is included. The cause code indicates the reason the UE has not received the GC Session announcement message, such as UE is unreachable, UE is outside Group communication service area, UE in extended Discontinuous Reception (eDRX) mode, UE in power saving mode.

Step 8*a*: The SMF 310 may collect all notification messages from one or multiple AMF-1 308 via the AMF-2 350 for all UEs 202 that are targeted to receive group communication data. The SMF 310 may send a GC Session Status Notification message 660 towards the AF, either directly or via the NEF. In some embodiments, the SMF 310 may use the Nsmf_EventExposure_Notify service of the SMF 310 to collect all notification messages from one or multiple AMF-1 308 via the AMF-2 350 for all UEs 202 that are targeted to receive group communication data. The SMF 310 may include the list of UE IDs (such as GPSI, External UE IDs, SUCI, 5G GUTI, SUPI) that may not join the GC Session and the reason (or cause) for corresponding UE that has not joint the GC Session, Internal Group ID, AF Transaction ID, TMGI. The reason could be UE 202 is outside of region that has GC Session, the UE 202 is not reachable, the UE 202 is de-registered, the UE ID is not valid, UE in extended Discontinuous Reception (eDRX) mode, UE in power saving mode.

Step 8b: The NEF 314 may forward the GC Session Status notification message 660 receive from the SMF 310 in step 8a to the AF 322. The NEF 314 may use the Nnef_EventExposure_Notify service to deliver the GC Session Status Notification to the AF. The NEF 314 may replace some types of UE ID, for example SUCI, 5G GUTI, SUPI to GPSI. The NEF 314 may replace Internal Group ID by External Group ID.

In some embodiments, the AF 322 is configured to communicate with the MSF 310, and the SMF 310 may directly send message 660 to the AF 322.

As stated above, detailed examples of operations will now be discussed,

Service operation for the functions, such as AF, to send request for creating the group communication (GC) session will now be discussed using the example name Nnef_GCSession_Create (or also called Nnef_PDUSession_Create). Example inputs can include one or more of following information: a list of UE IDs (e.g. GPSI, SUPI, External UE ID), DNN, S-NSSAI, Protocol Configuration Options, Requested PDU type (GC Session, IP PDU Session, Ethernet PDU Session, Unstructured PDU Session). Optional inputs can include for GC Session: UE Information (UE IDs like GPSI, SUPI, UE Location Information like Geographic Zone ID(s) and/or list of cell IDs), Internal Group ID, or list of UE IDs (e.g. SUPI, or GPSI, or External UE ID), location information of GC Session (e.g. Geographic Zone ID(s)), QoS requirements (value of standardized 5 QI, Maximum data rate of GC session, average data rate of GC session, packet delay budget, expected or maximum data volume in a certain period of time), number of data flows in the GC session, Network Slice Information (e.g. S-NSSAI), Application ID, AF-Service-Identifier, how the group communication data will be sent to the network (over NEF control plane or UPF user plane), Information of AS (e.g. IP version (IPv4 or IPv6), source IP Addresses or IP Prefixes, source UDP or TCP port number, packet flow description (PFD), Type of Service (TOS) (IPv4)/Traffic class (IPv6) and Mask, Flow Label (IPv6), Security parameter index), AN Type, DNN Selection Mode, subscription get notified of PDU Session status change. Example outputs can include result indication, and if success in addition: QFI(s), QoS Profile(s), Session-AMBR, QoS Rule(s), H-CN Tunnel Info, Enable pause of charging indication, Selected PDU type and SSC mode. Further optional outputs can include Cause, Protocol Configuration Options, UE IP address, IPv6 Prefix allocated to the PDU Session, information needed by V-SMF in case of EPS interworking such as the PDN Connection Type, Reflective QoS Timer. Further examples of outputs can include (for Response message for GC Session): Result Indication (e.g. Successful, Reject). Further optional outputs can include (for Response message for GC Session): Cause, Protocol Configuration Options for interface with UPF or NEF (e.g. HTTP), UPF or NEF IP address, UDP port of the UPF or NEF, QoS Rule(s) that may be sent to the UEs in the application layer.

Service operation for creating the PDU session or GC Session will now be discussed using the example name Nsmf_PDUSession_Create service operation. Example inputs can include SUPI, V-SMF ID, DNN, S-NSSAI, Protocol Configuration Options, Requested PDU type (Group Communication Session or PDU Session like IP PDU Session, Ethernet PDU Session, Unstructured PDU Session), Requested SSC mode, PDU Session ID, V-CN Tunnel Info, addressing information allowing the H-SMF to request the V-SMF to issue further operations about the PDU Session. AF ID (or AF-Service-ID), Transaction Reference ID(s). Examples of optional inputs can include UE location information, subscription get notified of PDU Session status change, PEI, GPSI, AN type, PCF ID, DNN Selection Mode. Further examples of optional inputs can include for GC Session: UE Information (UE IDs like GPSI, SUPI, UE Location Information like Geographical Zone ID(s)), Internal Group ID, or list of UE IDs (e.g. SUPI, or GPSI, or External UE ID), location information of GC Session (e.g. Geographic Zone ID), QoS requirements (Maximum data rate, average data rate, packet delay budget, expected or maximum data volume in a certain period of time), Network Slice Information (e.g. S-NSSAI), Application ID, how the group communication data will be sent to the network (over NEF control plane or UPF user plane), Information of AS (e.g. IP Addresses or IP Prefixes, UDP or TCP port number, packet flow description (PFD)), AN Type, DNN Selection Mode, subscription get notified of PDU Session status change, AF-to-UE message. Outputs may include one or more of following information NEF ID, AF ID (or AF-Service-ID), Transaction Reference ID(s), Result Indication, and if success in addition: QFI(s), QoS Profile(s), Session-AMBR, QoS Rule(s), H-CN Tunnel Info, Enable pause of charging indication, Selected PDU type and SSC mode. Further examples of outputs may include one or more of following information: Cause, Protocol Configuration Options, TMGI, UE IP address, IPv6 Prefix allocated to the PDU Session, information needed by V-SMF in case of EPS interworking such as the PDN Connection Type, Reflective QoS Timer. Further examples of outputs may include one or more of following information (for Response message for GC Session): NEF ID, AF ID (or AF-Service-ID), Transaction Reference ID(s), Result Indication (e.g. Successful, Reject). Further examples of outputs may include one or more of following information (for Response message for GC Session): Cause, TMGI, Protocol Configuration Options for interface with UPF or NEF (e.g. HTTP), UPF or NEF IP address, UDP port of the UPF or NEF, QoS Rule(s) that may be sent to the UEs in the application layer. Further optional outputs can include (for Response message for GC Session if the NEF is used for interface with AF): UPF information, such as UPF Address(es) and DL TEID for the NEF to send DL packets to the UPF(s).

Service operation for creating the Group Communication (GC) session will now be discussed using the example name Nsmf_GCSession_CreateSMContext. Example inputs can include AMF ID (AMF Instance ID), (R)AN Information: (R)AN Address, (R)AN ID, UE information: List of UEs, or Lists of UE IDs (e.g. SUPI, PEI) each correspond to a (R)AN node, Network slice information (e.g. S-NSSAI). Optional inputs can include PEI, UE location information, UE Time Zone, AN type, H-SMF identifier/address, Subscription for PDU Session Status Notification, indication that the SUPI has not been authenticated, PCF ID, DNN Selection Mode, UE PDN Connection Context, GPSI, UE presence in group communication service area, GUAMI(s) (if NF Type is AMF. Further example inputs may include one or more of following information: the UDM ID that is selected by the AMF, the PCF ID that is selected by the AMF, the AMF ID(s) that are currently serving UEs. Example outputs may include one or more of following information Result Indication, TMGI. Further example outputs include one or more of following information: Cause, GC Session ID, N2 SM information, N1 SM container.

When the GC Session is for a UE without USIM, the AMF provides the PEI and not the SUPI as identifier of the UE. When the GC Session is for Emergency services of an unauthenticated UE with an USIM, the AMF shall provide both the SUPI and the PEI and shall provide an indication that the SUPI has not been authenticated.

Service operation to get subscriber data by using a service of the UDM function will now be discussed using the example name Nudm SDM Get. Example inputs can include NF ID, Subscription data type(s), Key for each Subscription data type(s). Further example optional inputs can include Data Sub Key(s). Example outputs can include the consumer NF gets the requested subscription data. Subscription data type keys are defined in Table 1, data keys are defined in Table 2, subscription data types are defined in Table 3a-f.

TABLE 1

Subscription data types keys

| Subscription Data Types | Data Key | Data Sub Key |
|---|---|---|
| Access and Mobility Subscription data | SUPI | — |
| SMF Selection Subscription data | SUPI | — |
| UE context in SMF data | SUPI | S-NSSAI DNN |
| SMS Management Subscription data | SUPI | — |
| SMS Subscription data | SUPI | |
| Session Management Subscription data | SUPI | S-NSSAI DNN |
| Identifier translation | GPSI | — |
| Slice Selection Subscription data | SUPI | — |
| GC Session Subscription data | AF-Service-ID | Internal Group ID |

TABLE 2

Data Keys

| Data Set | Data Subset | Data Key | Data Sub Key |
|---|---|---|---|
| Subscription Data | Access and Mobility Subscription data | SUPI | — |
| | SMF Selection Subscription data | SUPI | — |
| | UE context in SMF data | SUPI | S-NSSAI DNN |
| | SMS Management Subscription data | SUPI | — |
| | SMS Subscription data | SUPI | |
| | Session Management Subscription data | SUPI | S-NSSAI DNN |
| | Slice Selection Subscription data | SUPI | — |

TABLE 3a

Subscription data types

| Subscription data type | Field | Description |
|---|---|---|
| Access and Mobility Subscription data (data needed for UE Registration and Mobility Management) | SUPI | Key |
| | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Subscribed-UE-AMBR | The Maximum Aggregated uplink and downlink MBRs to be shared across all Non-GBR QoS Flows according to the subscription of the user. |
| | Subscribed S-NSSAIs | The Network Slices that the UE subscribes to. |
| | Default S-NSSAIs | The Subscribed S-NSSAIs marked as default S-NSSAI. |
| | UE Usage Type | |
| | RAT restriction | 3GPP Radio Access Technology(ies) not allowed the UE to access. |
| | Forbidden area | Defines areas in which the UE is not permitted to initiate any communication with the network. |
| | Service Area Restriction | Indicates Allowed areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC for this PLMN. |

TABLE 3b

Subscription data types continued

| Subscription data type | Field | Description |
| --- | --- | --- |
| Access and Mobility Subscription data (data needed for UE Registration and Mobility Management) (continued) | RFSP Index | An index to specific RRM configuration in the NG-RAN. |
| | Subscribed Periodic Registration Timer | Indicates a subscribed Periodic Registration Timer value. |
| | Priority Services | Indicates the user is subscribed to priority.service (MPS). |
| Slice Selection Subscription data ( | SUPI | Key |
| | Subscribed S-NSSAIs | The Network Slices that the UE subscribes to. In roaming case, it indicates the subscribed network slices applicable to the serving PLMN. |
| UE context in AMF data | SUPI | Key |
| | AMF | Allocated AMF for the registered UE. Include AMF address and AMF NF Id. |
| | Access Type | 3GPP or non-3GPP access through this AMF |
| SMF Selection Subscription data | SUPI | Key |
| | Subscribed DNN list | List of the subscribed DNNs for the UE. |
| | Default DNN | The default DNN if the UE SMF Selection Subscription does not provide a valid DNN. |
| | LBO Roaming Information | Indicates whether LBO roaming is allowed per DNN, or per (S-NSSAI, subscribed DNN) |
| UE context in SMF data | SUPI | Key |
| | PDU Session Id(s) | List of PDU Session Id(s) for the UE |
| | For each PDU Session Id: | |
| | DNN | DNN for the PDU Session. |
| | SMF | Allocated SMF for the PDU Session. Includes SMF IP Address and SMF NF Id. |

TABLE 3c

Subscription data types continued

| Subscription data type | Field | Description |
| --- | --- | --- |
| SMS Management Subscription data (data needed by SMSF for SMSF Registration) | SUPI | Key |
| | SMS parameters | Indicates SMS parameters subscribed for SMS service such as SMS teleservice, SMS barring list |
| SMS Subscription data (data needed in AMF) | SUPI | Key |
| | SMS Supported | Indicates whether the UE supports SMS delivery over NAS over 3GPP access, or over non-3GPP access, or over both the 3GPP and non-3GPP access. |
| | SMSF address | Indicates SMSF address subscribed for SMS service. |
| Session Management Subscription data (data needed for PDU Session Establishment) | SUPI | Key |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI. |

TABLE 3c-continued

| Subscription data type | Field | Description |
|---|---|---|
| | For each DNN in S-NSSAI level subscription data: | |
| | UE Address | Indicates the subscribed static IP address(es) for the IPv4 or IPv6 or IPv4v6 type PDU Sessions accessing the DNN, S-NSSAI. |
| | Allowed PDU Session Types | Indicates the allowed PDU Session Types (IPv4, IPv6, IPv4v6, Ethernet, and Unstructured) for the DNN, S-NSSAI. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |

TABLE 3d

Subscription data types continued

| Subscription data type | Field | Description |
|---|---|---|
| Session Management Subscription data (data needed for PDU Session Establishment) (continued) | 5GS Subscribed QoS profile | The QoS Flow level QoS parameter values (5QI and ARP) for the DNN, S-NSSAI. |
| | Charging Characteristics | It may contain information on how to contact the Charging Function. This information, when provided shall override any corresponding predefined information at the SMF |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |
| GC Session Management Subscription data (data needed for MB Session Establishment) | AF-Service-Identifier, or Internal Group Identifier | Key |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI. |
| | For each DNN in S-NSSAI level subscription data: | |
| | UE Address | Indicates the subscribed static IP address(es) for the IPv4 or IPv6 or IPv4v6 type PDU Sessions accessing the DNN, S-NSSAI. |

TABLE 3e

Subscription data types continued

| Subscription data type | Field | Description |
| --- | --- | --- |
| GC Session Management Subscription data (data needed for GC Session Establishment) (continued) | Allowed GC Session Type | Indicates the allowed PDU Session Types (IPv6 GC Session, IPv4v6 GC Session, Ethernet GC Session, and Unstructured GC Session) for the DNN, S-NSSAI. |
| | Default GC Session Type | Indicates the default PDU Session Type for the DNN, S-NSSAI. |
| | 5GS Subscribed QoS profile | The QoS Flow level QoS parameter values (5QI and ARP) for the DNN, S-NSSAI. |
| | Charging Characteristics | It may contain information on how to contact the Charging Function. This information, when provided shall override any corresponding predefined information at the SMF |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |

TABLE 3f

Subscription data types continued

| Subscription data type | Field | Description |
| --- | --- | --- |
| GC Session Management Subscription data (data needed for GC Session Establishment) (continued) | List of GPSIs | Generic Public Subscription Identifier used inside and outside of the 3GPP system to address a 3GPP subscription. Used as the Key for translation to the corresponding SUPI (and optionally corresponding MSISDN). |
| | List of SUPIs | Corresponding SUPI for input GPSI |
| | GC Session Area (Optional) | List of (R)AN ID(s) or List of (R)AN IP Addresses |
| Identifier translation | MSISDN | Corresponding GPSI (MSISDN) for input GPSI (External Identifier). This is optionally provided for legacy SMS infrastructure not supporting MSISDN-less SMS. The presence of an MSISDN should be interpreted as an indication to the NEF that MSISDN shall be used to identify the UE when sending the SMS to the SMS-SC over T4. |

Service operation for registering UE's serving function in the UDM function will now be discussed using the example name Nudm_UECM_Registration. Example inputs can include NF ID, SUPI, PEI, NF Type, Internal Group ID, Access Type (if NF Type is AMF, SMSF), PDU Session ID (if NF Type is SMF), UE address (IP or Ethernet address for example) if NF Type is SMF. If NF Type is SMF: DNN or Indication of Emergency Services. Further example inputs can include if NF Type is SMF registering for serving GC Session: GC Session ID, TMGI, AF-Service-Identifier, Internal Group ID, List of UE IDs (such as GPSI, SUPI). Further example inputs can include if NF Type is AMF registering for serving GC Session: GC Session ID, TMGI, AF-Service-Identifier, Internal Group ID, List of UE IDs (such as GPSI, SUPI), GC Session Location(s) that the AMF-2 serves UEs (e.g. (R)AN ID(s), Registration Area IDs). Example outputs can include Result indication.

Service operation for query data from the UDR function will now be discussed using the example name Nudr_DM_Query. Example inputs can include Data Set Identifier, Data Key(s). Optional inputs may include Data Subset Identifier(s), SUPI, Data Sub Key(s) (for each Data Subset), AF-Service-ID, Internal Group ID, TMGI. The SUPI is used to identify which UE the latest list of stored PSIs belongs to. AF-Service-ID, and/or Internal Group ID is/are used to identify data belong to one UE Group. Example outputs can include Requested data.

Service operation for creating access and mobility (AM) policy association will now be discussed using the example name Npcf_AMPolicyControl_Create. Example inputs may include one or more of following information SUPI (or PEI in case of emergency PDU Session without SUPI), or AF-Service-Identifier and/or Internal Group Identifier. Other inputs may include one or more of following information provided by the AMF, such as Access Type, Permanent Equipment Identifier, GPSI, User Location Information, UE Time Zone, Serving Network, RAT type, List of subscribed Service Area Restrictions, (V-)PCF ID (if the consumer is AMF, when receiving the PCF ID from old AMF during inter-AMF mobility), H-PCF ID (if the consumer is V-PCF, when receiving the H-PCF ID from AMF), subscribed RFSP Index, UE access selection and PDU session selection policy information including the list of PSIs and Internal Group.

The outputs may include one or more of following information: the requested Access and mobility related policy information, UE access selection and PDU Session selection related policy, such as authorized Service Area Restrictions, authorized RFSP Index and URSP, and Policy Control Request Trigger. The AMF requests the PCF to apply operator policies for the UE. The AMF requests the PCF to apply operator policies for the UE; then the PCF acknowledges AMF with requested policy.

Service operation for creating session management (SM) SM Policy Association and provide relevant parameters about the PDU session or GC session to the PCF will now be discussed using the example name Npcf_SMPolicyControl_Update. Example inputs can include for PDU Session: PDU Session Id and SUPI (or PEI in case of emergency PDU Session without SUPI). Additional example inputs can include for GC Session, e.g. GC Session Id, Internal Group ID, TMGI. Other example inputs may include one or more information on the Policy Control Request Trigger condition that has been met such as Access Type, (new or removed) IPv4 address and/or IPv6 network prefix, User Location Information, UE Time Zone, Serving Network, RAT type, subscribed Session AMBR, or subscribed default QoS information. Further examples of optional inputs can include for GC Session: (new or removed) IPv4 address and/or IPv6 network prefix assigned to UPF or NEF for communications, e.g. over N6 interface, with the DN or Application Server; GC Session Location Information, Serving Network, RAT type, subscribed GC Session AMBR, or subscribed default QoS information. Example outputs can include success or not. Optional example outputs can include Policy information for the PDU Session.

Service operation for subscribing event exposure service of the AMF will now be discussed using the example name Namf_EventExposure_Subscribe. The consumer NF uses this service operation to subscribe to or modify event reporting for one UE, a group of UE(s) or any UE. A function, such as an AMF, may use this service to subscribe Event Exposure service of another AMF on behalf of another function, such as SMF. Example input may include one or more of following information: NF ID, target of the subscription: UE(s) ID (SUPI or Internal Group Identifier or indication that any UE is targeted), ((set of) Event ID(s), Notification Target Address (+Notification Correlation ID))s, Event Reporting Information. The NF ID is the ID of the function that receives the Event Exposure Notification messages. Other input information may be one or more of following input: Event Filter(s) associated with each Event ID, Subscription Correlation ID (in the case of modification of the event subscription). The output may include when the subscription is accepted: Subscription Correlation ID (required for management of this subscription).

The first corresponding monitoring event is reported by invoking Namf_EventExposure_Notify, if corresponding information is available.

The NF consumer subscribes to the event notification by invoking Namf_EventExposure to the AMF. The AMF allocates a Subscription Correlation ID for the subscription and responds to the consumer NF with the Subscription Correlation ID. UE ID identifies the UE, SUPI and/or GPSI. Event ID identifies the events that the NF consumer is interested in. The Subscription Correlation ID is unique within the AMF Set.

The ((set of) Event ID(s), Notification Target Address (+Notification Correlation ID)) helps the Event Receiving NF to co-relate a notification against a corresponding event subscription for the indicated Event ID.

In the case that the NF consumer subscribes to the AMF on behalf of other NF, the NF consumer include the Notification Target Address(+Notification Correlation ID) of other NF for the Event ID which is to be notified to other NF directly, and the Notification Target Address(+Notification Correlation ID) of itself for the Subscription Correlation ID change event. Each Notification Target Address (+Notification Correlation ID) is associated with the related (set of) Event ID(s). When the Subscription Correlation ID change due to the AMF reallocation, the notification is sent to NF consumer which triggers this subscription.

Event filter may include "AN type(s)" as part of the list of parameter values to match, and it indicates to subscribe the event per Access Type.

Event receiving NF ID identifies the NF that shall receive the event reporting.

When the consumer NF needs to modify an existing subscription previously created by itself in the AMF, it invokes Namf_EventExposure_Subscribe service operation which contains the Subscription Correlation ID and the new Event Filters with Event ID to the AMF.

Namf_EventExposure_UnSubscribe service operation

Service operation for unsubscribing event exposure service of the AMF will now be discussed using the example name Namf_EventExposure UnSubscribe. The NF consumer uses this service operation to unsubscribe for a specific event for one UE, group of UE(s), any UE. A function, such as an AMF, may use this service to subscribe Event Exposure service of another AMF on behalf of another function, such as SMF. The input may include Subscription Correlation ID. The output may include Operation execution result indication.

The NF consumer unsubscribes the event notification by invoking Namf_EventExposure_Unsubscribe (Subscription Correlation ID) to the AMF.

Service operation for using message transfer service of the AMF will now be discussed using the example name Namf_Communication_N1N2MessageTransfer. Example inputs may include one or more of following information: CN NF ID, Message type (N1 or N2 or both), Message Container (s) where at least one of the message containers (N1 or N2) is required. Examples of other inputs may include one or more of following information: last message indication, Session ID, AN Type, Paging Policy Indication, ARP, Group communication service area for the N2 SM information, GC Session Information, 5 QI. Input for GC Session Information:

GC Session ID;
ARP: paging priority;
Internal Group ID: The internal group ID of UEs that may receive the group communication data;
TMGI of the UE group that may receive the group communication data.; Group communication service area (of group communication location information): The area of GC Session, may be indicated by the list of (R)AN nodes IDs (and each (R)AN node 302 may have a list of Cell IDs that join the GC Session), tracking area ID, Registration area ID, service area of the SMF, geographical zone ID. If the UE is currently outside the Group communication service area, the AMF may not need to send the GC Session Announcement message to the UE.
List of UE IDs (SUPI, 5G GUTI, GPSI) to receive the N1 SM message.

N1 SM message to be sent to the UE. The N1 SM message may contain the following information:
GC Session ID
Time to start GC Session
Amount of data the UE may expect to receive
QoS Information: may include QoS Rule; or some QoS parameters of the QoS Rule, such as Maximum Bit Rate in the downlink, Resource Type (e.g. GBR, non-GBR, delay critical GBR), Guaranteed Flow Bit Rate (GFBR), Maximum Flow Bit Rate (MFBR), Session-Aggregate Maximum Bit Rate (Session-AMBR).
TMGI
Data container to carry a message, such as AF-to-UE message that sent from the AF to UEs.

Example outputs may include Result indication. Other outputs include one or more of following information. Redirection information. If the UE is in CM-IDLE state, the AMF initiates the network triggered service request procedure and responds to the consumer NF with a result indication, "attempting to reach UE". Otherwise, the AMF responds to the consumer NF, with a Namf_Communication_N1N2MessageTransfer response, providing a result indication of whether the AMF was able to successfully transfer the N1 and/or the N2 message towards the UE 202 and/or the AN. A result indication of "N1/N2 transfer success" does not mean that N1 message is successfully received by the UE. It only means that the AMF is able to successfully send the N1 or N2 message towards the AN. The "GC service area for the N2 SM information", if included is used by the AMF to determine whether the N2 SM information provided by the consumer NF can be used towards the AN based on the current location of the UE. If the location of the UE is outside the "GC service area for the N2 SM information" indicated, the AMF shall not send the N2 SM information to the AN. In case the consumer NF knows that a specific downlink N1 message is the last message to be transferred in this transaction, the consumer NF shall include the last message indication in the Namf_Communication_N1N2MessageTransfer service operation so that the AMF knows that the no more downlink N1 message need to be transferred for this transaction. If the result of the service operation fails, the AMF shall set the corresponding cause value in the result indication which can be used by the NF consumer for further action. In case the related UE is not served by AMF and the AMF knows which AMF is serving the UE, the AMF provides redirection information which can be used by the consumer NF to resend UE related message to the AMF that serves the UE.

Service operation to provide the previously subscribed event information to the NF Consumer which has subscribed to that event before will now be discussed using the example name Namf_EventExposure_Notify. Example inputs may include one or more of following information: AMF ID (GUAMI), Notification Correlation Information, Event ID, corresponding UE (SUPI and if available GPSI), TMGI. Other outputs may include one or more of following information: event specific parameter list. When the AMF detects a UE access and mobility event corresponding to a Subscription, it invokes Namf_EventExposure_Notify service operation to the NF consumer(s) which has subscribed to the UE mobility event before. The event is notified towards the consumers for which the Event filters (which may include "AN type(s)") match. The Notification Target Address (+Notification Correlation ID) indicates to the NF consumer the specific event notification subscription made by the NF consumer. The event specific parameter indicates the type of mobility event and related information, e.g. Registration Area Update/new Registration Area. The event specific parameter list provides the values that matched for generating the event notification. The parameter values to match are specified during the event subscription. For example if the event type reported is "AN change", the event specific parameter list contains the value of the new AN. For GC Session Events, the AMF may notify the subscribed NF (such as SMF):
List of UE IDs (e.g. SUPI, GPSI) that are successfully received GC Session Announcement message. For each of UE ID, the AMF may indicate the UE location information.
List of UE IDs (e.g. SUPI, GPSI) that are not successfully received GC Session Announcement message. For each UE, a cause is included, such as UE is unreachable, the UE is de-registered, the UE ID is not valid, the UE is outside GC service area.

Service operation for the NEF to report the event to the consumer that has previously subscribed will now be discussed using the example name Nnef_EventExposure_Notify. Example inputs may include one or more of following information Event ID, Notification Correlation Information. For GC Session Events, the AMF may notify the subscribed AF:
External Group ID, TMGI, List of UE IDs (e.g. GPSI, External UE ID) that have successfully received GC Session Announcement message. For each of UE ID, the NEF may indicate the UE location information.
External Group ID, TMGI, List of UE IDs (e.g. SUPI, GPSI) that have not successfully received GC Session Announcement message. For each UE, a cause is included, such as UE is unreachable, the UE is de-registered, the UE ID is not valid, The UE is outside GC service area.

Other inputs may include one or more of following information: event information (defined on a per Event ID basis). Example outputs can include Operation execution result indication.

Service operation for the AMF-1 308 to provide UE positioning information to the consumer NF will now be discussed using the example name Namf_Location_ProvidePositioningInfo. Example inputs may include one or more of following information: UE Identification (SUPI or PEI, or Internal Group ID, or list of UE Identifications (SUPI, or PEI)), External Client Type, TMGI. Other inputs may include one or more of following information: location QoS, Supported GAD shapes. Example outputs can include Success/Failure indication. Optional outputs can include Geodetic Location, Civic Location, List of Serving (R)AN Address ((R)AN ID or (R)AN IP Address), Position Methods Used, Failure Cause.

Figure 7A:
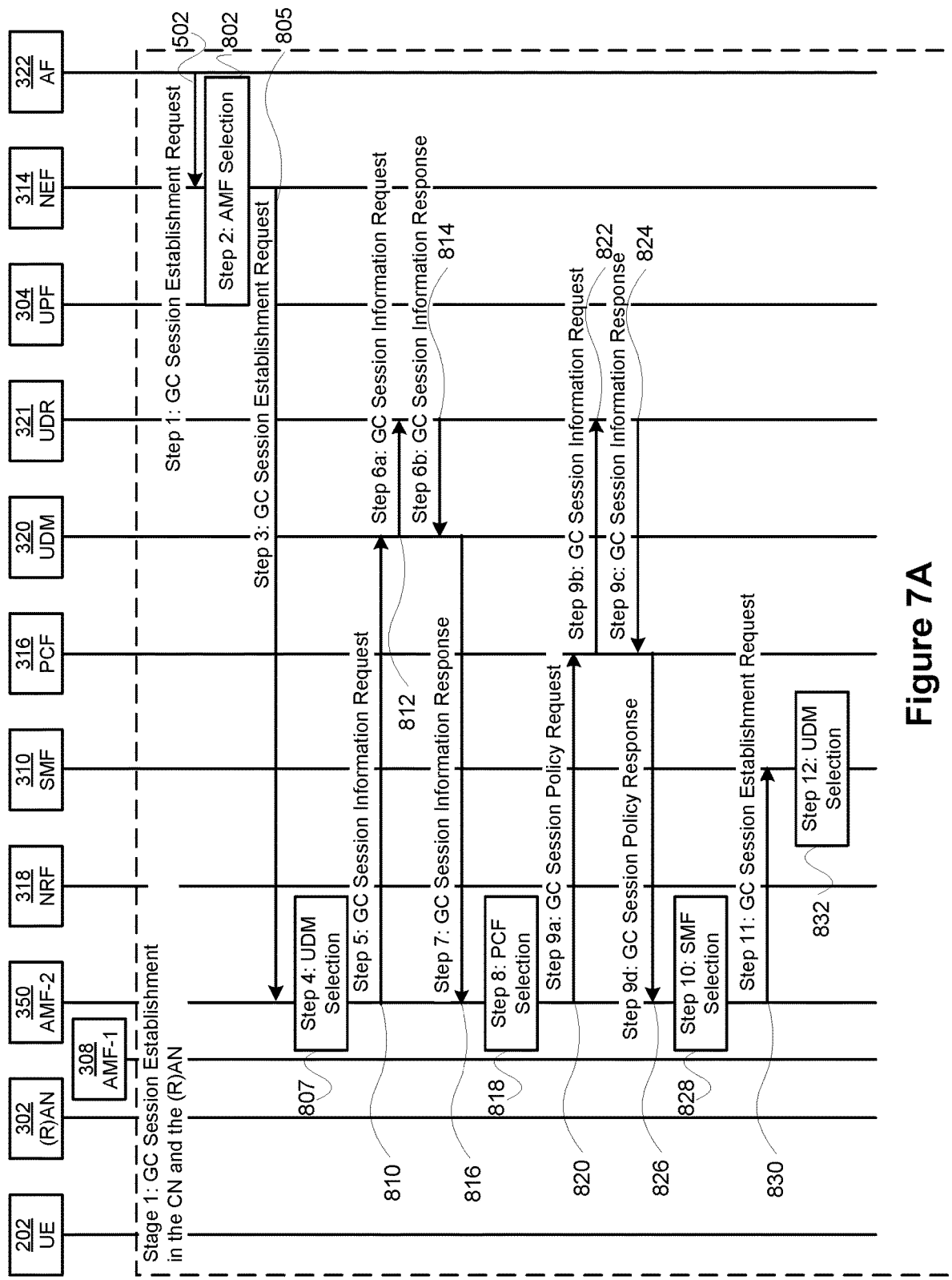
FIG. 7A, 7B, and 7C illustrates an embodiment of an GC Session establishment in the CN and (R)AN.

FIG. 7A illustrates an embodiment of an GC session establishment in the CN and the (R)AN node 302. The following are the steps of FIG. 7A.

Step 1: The AF 322 sends a GC session establishment request message 502 to the NEF 314 in a manner similar to step 1 of FIG. 4A described above.

Step 2: The NEF 314 may perform AMF selection 802 by any one or more of the following methods:
(1) Pre-configured AMF information for GC Sessions in the NEF 314;
(2) The NEF 314 may request the NRF function to get AMF information by using, for example a service of NEF function, such as Nnrf_NFDiscovery_Request. The NEF 314 may send Network Slice Information (S-NSSAI), DNN, UE Group information (e.g. External Group ID, Internal Group ID), NF type indicating AMF function that can support GC Session management, AF-Service-Identifier, Application Identifier, Application Type (e.g. V2X application, IoT application, Video streaming application, TV broadcasting application) to the NRF for the AMF selection. The NRF 314 returns the AMF Address information (e.g. AMF ID, and/or FQDN, and/or IP Address(es), and/or Endpoint Address(es), and the AMF profile(s)); The AMF profile may contain attributes of the AMF, such as Network Slice Information (S-NSSAI), DNN, UE Group information (e.g. External Group ID, Internal Group ID), NF type indicating AMF function that can support GC Session management, AF-Service-Identifier, Application Identifier, Application Type (e.g. V2X application, IoT application, Video streaming application, TV broadcasting application). Based on the AMF profile(s), the NEF may select an AMF function, which could be an AMF set or an AMF instance of an AMF set.

(3) The NEF 314 requests the UDM 320 or the UDR 321 to get the GC Session binding information, which provide a mapping between AF-Service-Identifier ID (or External Group ID), and/or network slice information (e.g. S-NSSAI) and/or DNN with AMF ID. The UDM 320 may have information of AMF function or AMF instance(s) that is/are preconfigured to serve GC Sessions of the specific the AF(s) 322.

Step 3: The NEF 314 may send a GC Session Establishment Request message 805 to the selected AMF-2 350, which include the information received from the AF 322. In case the group communication data will be sent to the NEF 314, the NEF 314 may include an uplink TEID for the UPF 304 to send the GC Session Establishment Request message 805 to the NEF 314 for acknowledgement of successfully received data or request for retransmission of missing packets. The NEF 314 may map the External Group Identifier to the Internal Group Identifier and send the Internal Group Identifier to the AMF-2 350. The NEF 314 may map the Geographic Zone ID to the (R)AN Address or the list of (R)AN Address(es) or (R)AN ID or the list of RAN ID(s), each of (R)AN node may have the Cell ID or list of Cell ID(s) that join the GC Session.

Step 4: The AMF-2 350 may create a TMGI for the UEs 202 that will receive group communication data. The AMF-2 350 may perform UDM selection 807 to select a UDM 320 to get the GC Session information. The AMF-2 350 may use the local information in the AMF-2 350 to select a UDM 320. The AMF-2 350 may access NRF 318 to discover a UDM 320, by sending Nnrf NFDiscovery Request message. The AMF-2 350 may provide NRF 318 with one or more of following information for the NRF 318 to select a UDM 320: AF-Service-Identifier, Application information (e.g. Application ID, type of application (e.g. video multicast or broadcast, voice multicast or broadcast, V2X data multicast or broadcast), UE Group Information (e.g. External Group ID or Internal Group ID, TMGI, Group TMSI), network slice information (e.g. S-NSSAI), DNN.

Step 5: After selecting a UDM 320, the AMF-2 350 may send a message, such as GC Session Information Request message 810, to the UDM 320 to get information related to GC Session. The GC Session Information Request message 810 may include one or more of the session information contained in the received GC Session Establishment Request message 805 in step 3 and TMGI if the AMF assigned a TMGI for the UE group. In some embodiments, the AMF-2 350 use the Nudm_SDM_Get service of the UDM 320 to get information related to GC Session.

The AMF-2 350 may also implicitly register itself to the UDM 320 as a serving AMF-2 function for the GC Session. Alternatively, the AMF-2 350 may explicitly register itself to the UDM 320 as a serving the functionality of the AMF-2 350 for the GC Session by using Nudm_UECM_Registration service with modification discussed under detailed examples of operations. The AMF-2 350 may provide any combination of following information: GC Session ID, AF-Service-Identifier, Internal Group ID, TMGI, network slice information (e.g. S-NSSAI), DNN.

Step 6a: Following receipt of the GC Session Information Request message 810 from the AMF-2 350, the UDM 320 may send a request, e.g. a GC Session information request message 812, to the UDR 321 to get the information related to GC Session. The GC Session Information Request message 810 may include any combination of following information: the AF-Service-Identifier ID, and External Group ID, network slice information (S-NSSAI), DNN, TMGI. If the UDM has the mapping between External Group ID and UE Group ID (e.g. Internal-Group ID), the UDM may also include the Internal-Group ID. The UDM 320 may create a TMGI and also sends this information to the UDR 321.

The GC Session information request message 810 sent in step 6a may be implemented by using Nudr DM Query service of the UDR 321 to request for GC Session Management Subscription data. The UDM 320 may include AF-Service-Identifier, or Internal Group Identifier and/or TMGI (if the TMGI is available) as data key to get the GC Session Management Subscription data.

Step 6b: Following receipt of the GC Session information request message 812 from the UDM 820, the UDR 321 sends a GC Session information response message 814 to the UDM 320. The GC Session information response message 814 may include UE Group ID (e.g. Internal-Group ID and/or TMGI (if the TMGI is available)), list of UE IDs of UEs 202 in the UE Group, Location Information of GC Session (e.g. Addresses of RAN nodes, Geographic Zone ID(s)), and Network Function information if available (e.g. serving AMF, UPF Address(es), NEF Address).

The message GC Session information response message 812 sent in step 6b may be implemented by using Nudr DM Query response of the UDR 320 Nudr_DM_Query service operation and may be further modified as described earlier.

Step 7: The UDM 320 sends a message, e.g. GC Session information response 816, to the AMF-2 350, which includes information received from the UDR 321 in step 5b. The UDM 320 may also send to the AMF-2 350 the Internal-Group ID and/or the TMGI, one or more UEs in a list of UE IDs, Subscription information related to UE Group (e.g. Maximum bit rate of GC Session, Maximum traffic volume in a certain period), Network Slice Information (e.g. S-NSSAI), one or more SMF ID(s) or SMF address(es) if the UDM 320 is aware of SMF function that may be pre-configured or registered in the UDM 320 to serve GC Session.

The GC Session information response message 816 sent in step 7 may be implemented by using Nudm_SDM_Get response service of the UDR Nudm_SDM_Get service operation and is provided in this document with updates.

Step 8: The AMF-2 350 may perform PCF selection 818 to select a PCF 316 according to any suitable criteria. The additional information to select PCF 316 may be AF-Service-Identifier, which is to identify AF 322 and/or AS 402.

Step 9a: The AMF-2 350 may have local PCC rules for the GC Session. Otherwise, the AMF-2 350 may send a message, e.g. GC Session Policy Request message 820, to the selected PCF 316 to get the policies for the GC Session. The GC Session Policy Request message 820 may include an UE Group ID information (e.g. External Group ID, Internal-Group ID, TMGI), Application information (e.g. AF-Service-Identifier), Network Slice Information (e.g. S-NSSAI), DNN.

The GC Session Policy Request message 820 in step 9a may be implemented by using Npcf_SMPolicyControl_Create_Request as described in this document to establish a session with the PCF and get the default PCC Rules for the GC Session.

Step 9b: This step 822 is similar to step 9a described above with respect to FIG. 4A.

Step 9c: Following receipt of the GC Session Information Request message 822 from the PCF 316, the UDR 321 may send a message, e.g. GC Session Information Response message 824, to the PCF. The GC Session Information Response message 824 may contain information on group communication Subscription information, such as: GC Session area information (e.g. geographical zone IDs, registration area(s), list of (R)AN nodes ID(s)), QoS requirements (resource type (e.g. GBR, delay critical GBR, or non-GBR), maximum flow data rate, guaranteed flow data rate, packet delay budget, expected or maximum group communication traffic volume in certain period of time), charging information, and Access Type (e.g. 5G RAT or 4G RAT), UE subscription information (Service Level Agreement, QoS policy, charging policy, traffic routing policy (Access type(s)), for example.

The GC Session Information Response message 824 sent in step 9c may be implemented by using Nudr UDM Query response service.

Step 9d: The PCF 316 may send a message, e.g. GC Session Policy Response message 826, to the AMF-2 350. The GC Session Policy Response message 826 may include all or part of information the PCF 316 received from the UDR 321. The PCF 316 may generate Access and Mobility management policy for the AMF-2 350 for the GC Session. For example, the PCF 316 may send the location information of the GC Session, such as the one or more of (R)AN Address(es) (such as (R)AN ID(s), or (R)AN IP address(es)), each (R)AN node may have a one or more of Cell ID(s).

The GC Session Policy Response message 826 sent in step 9d may be implemented by using Npcf_SMPolicyControl_Create response service as described in this document.

Step 10: The AMF-2 350 may perform SMF selection 828 to select and SMF 310 to establish user plane connection for the GC Session by one or more of the following methods:
(1) SMF information is pre-configured in the AMF-2 350;
(2) The AMF-2 350 may obtain the SMF 310 information from UDM 320 in step 7 if the UDM 320 has information of SMF(s) 310 that could serve the GC Session;
(3) The AMF-2 350 may request the NRF 318 to get the address of the SMF 310 (e.g., SMF address). In method (3), the AMF-2 350 may provide NRF 318 with one or more of following information: application information (e.g. AF-Service-Identifier), Network Slice Information (e.g. S-NSSAI), Geographic location of group communication service (e.g. Geographic Zone ID(s), or (R)AN Address(es)), Type of Application (e.g. V2X Application, IoT Application, Local Area Network (LAN), Video Streaming, Video Broadcasting), Application ID, for NRF 318 to select an MSF 310. The NRF 318 may provide the AMF-2 350 a list of SMF set(s) or a list of SMF instances, and NRF 318 may provide SMF profiles. The SMF profile may contain one or more of following attributes: SMF Set ID, SMF instance ID, SMF instance address (e.g. IP address(es), FQDN), application information (e.g. AF-Service-Identifier(s), AF ID(s)), Network Slice Information (e.g. S-NSSAI), Geographic location of group communication service (e.g. Geographic Zone ID(s), or (R)AN Address(es)), Type of Application (e.g. V2X Application, IoT Application, Local Area Network (LAN), Video Streaming, Video Broadcasting), Application ID(s). Based on the information provided by the NRF 318, the AMF-2 350 selects an SMF set, or an SMF instance of an SMF set.

Some SMF instances may be configured to serve a certain area. The AMF-2 350 may use the information of AMF-1 308 in order to find the UE locations (e.g., locations of UEs 202) in order to select a MSF 310. For example, the AMF-2 350 may request the AMF-1 308 to provide the UE location (e.g., location of the UE 202) by using Namf_Location_ProvidePositioningInfo service of AMF-1 308 described in this document with possible modifications. The AMF-1 308 provides AMF-2 350 with UE locations.

Step 11: The AMF-2 350 may send a message, e.g. GC Session Establishment Request message 830, to the selected SMF 310 to establish GC Session. In some embodiments, the GC Session Establishment Request message 830 may be implemented by using Nsmf_GCSession_CreateSMContext_Request as described under detailed examples of operations.

Steps 12: Similar to the UDM selection method described in step 4 above with respect to FIG. 4A.

Figure 7B:
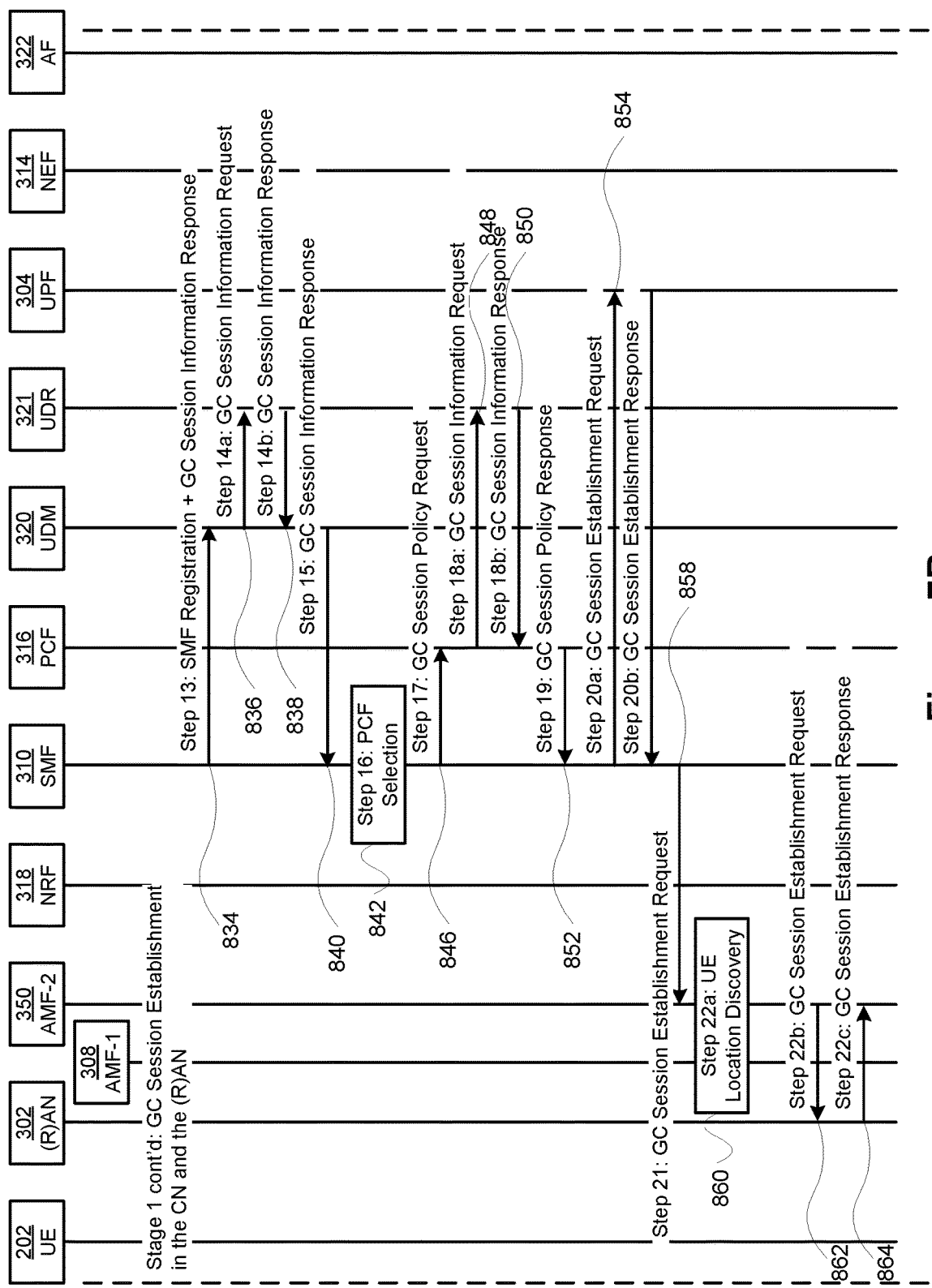

Step 13 of FIG. 7B: Similar to the messages sent by the SMF 310 described in step 4 above with respect FIG. 4A.

Figure 7C:
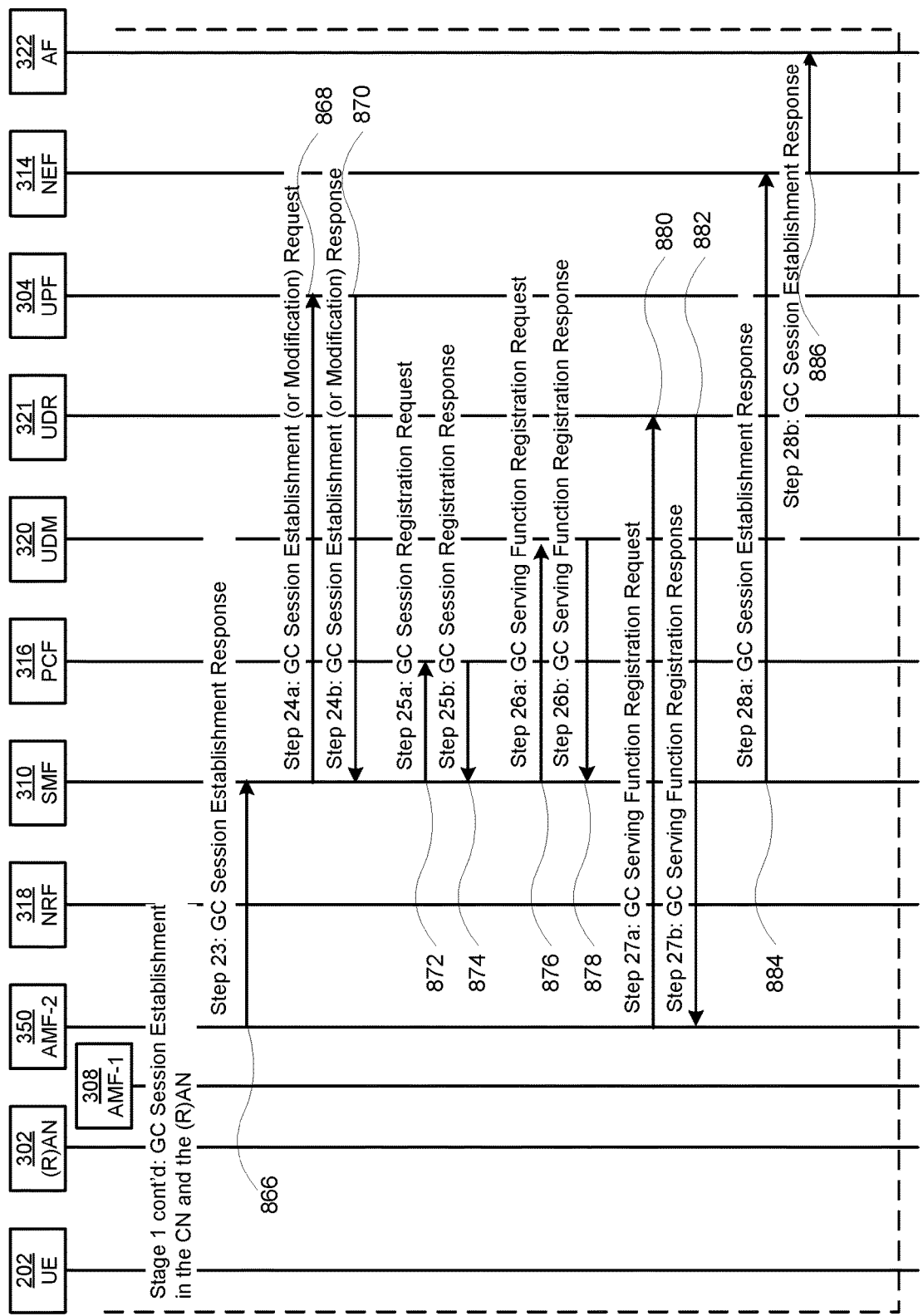

Step 14 to 28 of FIG. 7B and FIG. 7C: Similar to step 5 to 20 described above with respect to FIG. 4A and FIG. 4B.

Steps 1a and 14b of FIG. 7B: similar to steps 5a and 5b, respectively, as described above with respect to FIG. 4A.

Step 15 of FIG. 7B: similar to step 6 described above with respect to FIG. 4A.

Step 16 of FIG. 7B: similar to step 7 described above with respect to FIG. 4A.

Step 17 of FIG. 7B: similar to step 8 described above with respect to FIG. 4A.

Steps 18a and 18b of FIG. 7B: similar to steps 9a and 9b, respectively, described above with respect to FIG. 4A.

Step 19 of FIG. 7B: similar to step 10 described above with respect to FIG. 4A.

Steps 20a and 20b of FIG. 7B: similar to steps 11a and 11b, respectively, described above with respect to FIG. 4A.

Step 21 of FIG. 7B: The SMF 310 may select an AMF-2 350 by using the same methods as described in step 12 above with respect to FIG. 4A. Then the SMF may send a message 858 GC Session Establishment Request to the selected AMF-2 350; the information included in the message 858 is similar to the message 530 in step 12 described above with respect to FIG. 4A.

Step 22a of FIG. 7B: The AMF-2 350 may perform UE location discovery 860 in order to find the (R)AN node 302 that is/are serving UE 202 by using the information provided by the SMF 310 in step 21. The AMF-2 350 may use the methods described in step 13 described above with respect to FIG. 4A to discover the (R)AN node 302 that is/are serving UE 202.

Steps 22b and 22c of FIG. 7B: similar to steps 14a and 14b, respectively, described above with respect to FIG. 4B.

Step 23 of FIG. 7C: similar to step 15 described above with respect to FIG. 4B.

Steps 24a and 24b of FIG. 7C: similar to step 16a and 16b, respectively, described above with respect to FIG. 4B.

Steps 25a and 25b of FIG. 7C: similar to step 17a and 17b, respectively, described above with respect to FIG. 4B.

Steps 26a and 26b of FIG. 7C: similar to step 18a and 18b, respectively, described above with respect to FIG. 4B.

Steps 27a and 27b of FIG. 7C: similar to step 19a and 19b, respectively, described above with respect to FIG. 4B.

Steps 28a and 28b of FIG. 7C: similar to step 20a and 20b, respectively, described above with respect to FIG. 4B.

Figure 8:
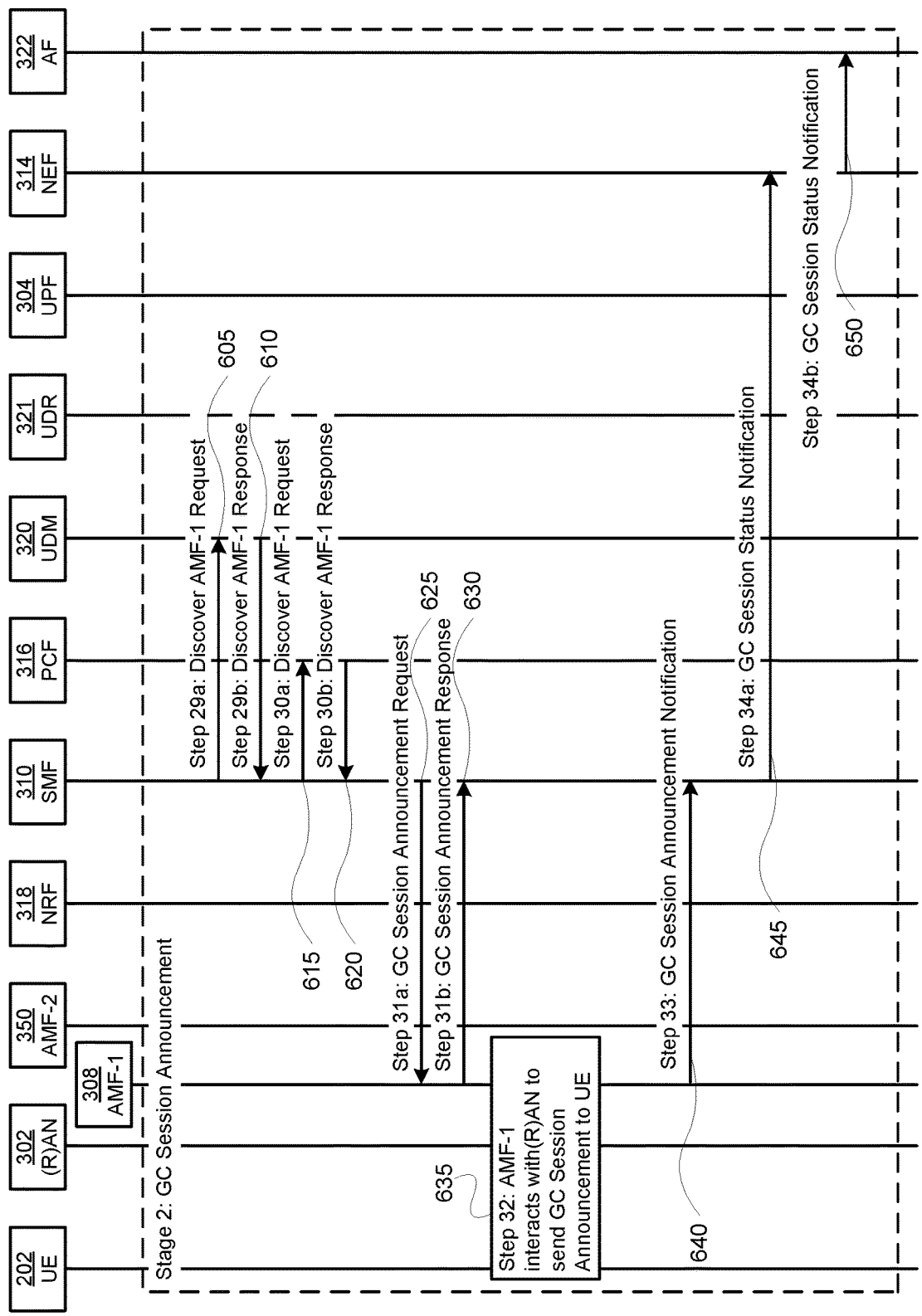
FIG. 8 illustrates an embodiment of an GC Session Announcement.

FIG. 8 illustrates an embodiment of a GC Session Announcement. Steps 29 to 34 of FIG. 8 are similar to those described above with respect to steps 21 to 26 FIG. 5.

Figure 9:
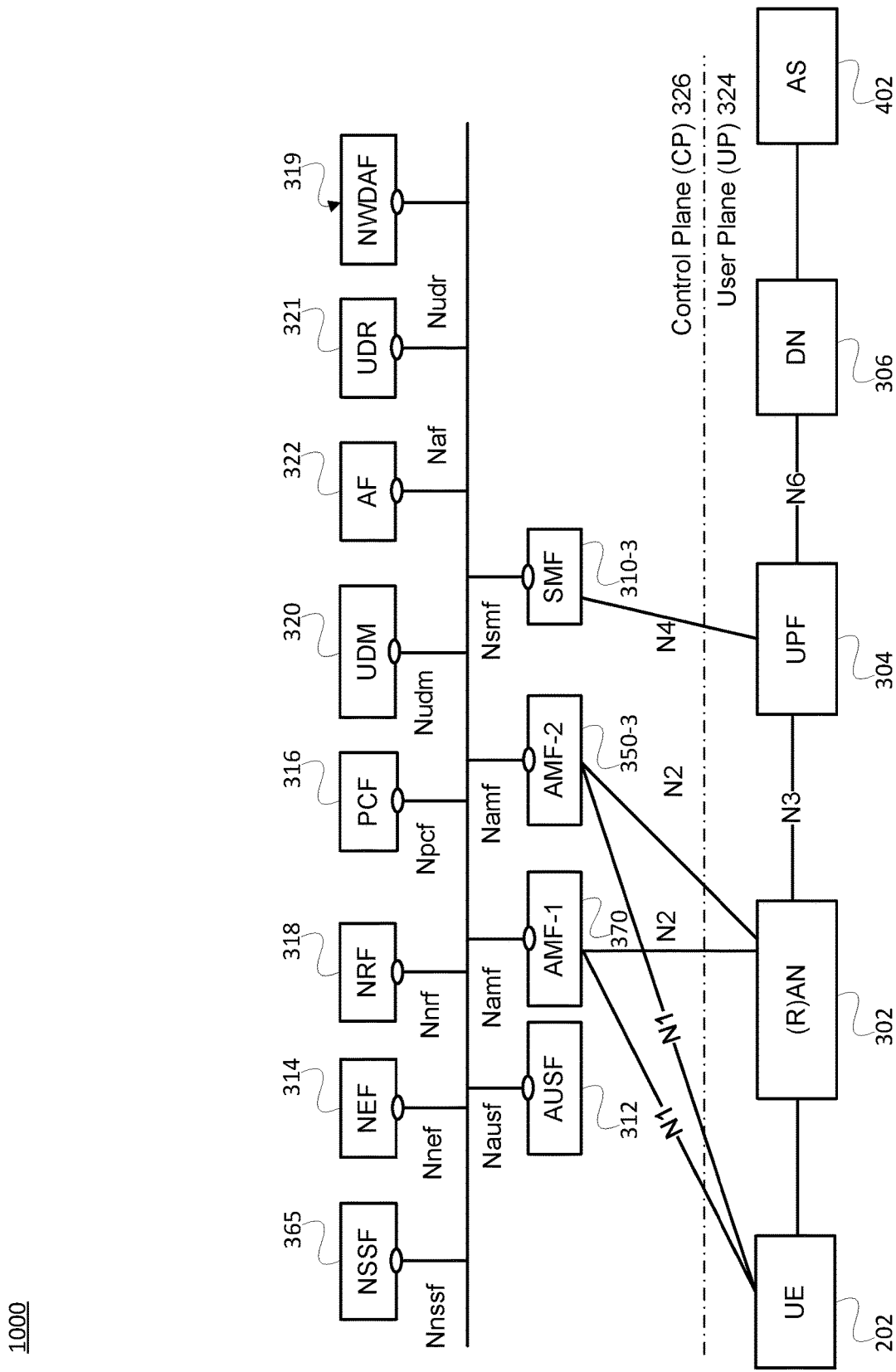
FIG. 9 is a block diagram illustrating a service-based view of a system architecture of a 5G Core Network with two AMFs that are able to communicate with the UE.

FIG. 9 illustrates a service-based architecture wherein both AMF-1 308 and the AMF-2 350-3 have a N1 connection to UE 202. In the embodiment illustrated by FIG. 10, when the UE 202 has simultaneous unicast and GC Sessions, the AMF-2 350-3 may have an N1 connection to the UE 202 as shown in FIG. 9. The AMF-2 350-3 supports CN functions to establish and manage the GC Session. The AMF-2 350-3 supports CN functions to send messages related to GC Session to the UE 202 using an N1 interface. In the service-based architecture shown in FIG. 9, the MSF 310-3 has all the functional of the MSF 310-1 shown in the service-based architecture of FIG. 2, with additional functionality described above. Similarly, the AMF 850-3 has all the functional of the AMF 850-1 shown in the service-based architecture of FIG. 2, with additional functionality described above.

In these embodiments, the GC Session may include multiple data flows. Each data flow may be represented by group communication flow identifier. The MSF 310-3 is similar to SMF 310 described above, however, it includes additional functionality to create the group communication flow ID for each data flow. The AF 322 may request multiple data flows. The AF 322 may include information (for example IP address, UDP or TCP port number(s), upper layer protocol) to distinguish data flows in the GC Session request. The MSF 310-3 may establish one GC Session that carries multiple data flows.

When the AF 322 wants to modify the GC Session, the AF 322 may send a message to the NEF 314 that carries one or more of following information: AF Transaction ID, UE information, GC Session location information, TMGI, QoS information, group communication flow ID, QoS information. The NEF 314 may map the GC Session location information (such as Geographic Zone ID to (R)AN Address(es) or (R)AN ID(s), and may include for each (R)AN node one or more Cell IDs)

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

An aspect of the disclosure provides a method for supporting operation of a wireless communication network in which a first Access Management Function (AMF) is associated with a first UE and the first AMF is configured to manage access and mobility for the first UE. Such a method includes a core network control plane function of the wireless communication network infrastructure, after receipt of one or more messages from a core network portion of the wireless communication network, communicating with an access node over a control plane interface to cause the access node to support a group communication (GC) session with a plurality of UEs, including the first UE. In some embodiments, the core network control plane function is implemented in the first AMF. In some embodiments, the core network control plane function is a second AMF function that operates separately from the first AMF. In some embodiments, the one or more messages received from the core network portion of the wireless communication network includes a single GC Session establishment request. In some embodiments, the core network portion of the wireless communication network includes a second core network control plane function to manage one or more GC Sessions, such as establishment, modification, and release of one or more GC Sessions. The second core network control plane function may be implemented in an existing Session Management Function (SMF). In the following, the functionalities of the second core network control plane function is implemented in a SMF function. The GC Session establishment request is received by the SMF. In some embodiments, the single GC session establishment request is received from an Application Function (AF) and relayed by the Network Exposure Function (NEF) to the SMF. In some embodiments, the control plane interface is an N2 interface and the core network control plane function communicates with the access node over the N2 interface without utilizing an N1 interface. In some embodiments, the method further includes the core network control plane function instructing the first AMF to send a message to the first UE. In some embodiments, the message comprises a session management message for providing the first UE with information about the GC Session. In some embodiments, the method further includes the core network control plane function interacting over control plane messaging with the core network portion of the wireless communication network to discover the first Access Management Function. In some embodiments, the method further includes the core network control plane function receiving a reply from the first AMF, and forwarding the reply to a Session Management Function (SMF). In some embodiments, the method further includes the core network control plane function interacting with the first AMF to perform UE location discovery. In some embodiments, the method further includes the core network control plane function subscribing to notification messages from multiple AMFs related to UEs which join to the GC Session. In some embodiments, the first Access Management Function is operatively coupled to the core network control plane function. In some such embodiments, the method further includes core network control plane function, after receipt of a further message from the first AMF, the further message indicative of a communication from the first UE, forwarding the further message to the core network portion of the wireless communication network. This can be for a UE requesting to subscribe to the GC Session. In some embodiments, one or more additional Access Management Functions are operative to communicate with different respective ones of the plurality of UEs. In some such embodiments, the method further includes the core network control plane function discovering the one or more additional Access Management Functions, and subsequently relaying messages between the one or more additional Access Management Functions and the core network portion of the wireless communication network.

Another aspect of the disclosure provides a method for supporting operation of a wireless communication network by a Session Management Function (SMF) of the wireless communication network infrastructure. The method includes determining and storing identities of a first access management function (AMF) operative to support communication with a plurality of UEs, and a core network control plane function operative to support a GC Session with the plurality of UEs. The method further includes interacting with the core network control plane function to cause the core network control plane function to communicate with an access node over a control plane interface to cause the access node to support a GC Session with the plurality of UEs. In some embodiments, the method further includes receiving a request from an AF, either directly or indirectly via an NEF, for establishment of a GC Session and selecting the second AMF for the GC Session. In some embodiments, the control plane interface is an N2 interface, the first AMF includes an N1 interface, the core network control function communicating with the access node over the N2 interface without utilizing an N1 interface. In some embodiments, the method further includes the SMF forwarding messaging relating to a unicast communication to a first AMF, and forwarding messaging relating to the establishment, configuration and operation of the GC Session to the core network control plane function. In some embodiments, the first AMF is operatively coupled to the core network control plane function, and the method further includes the SMF sending messaging relating to a unicast session for the first UE to the core network control plane function for forwarding to the first AMF by the core network control plane function.

Another aspect of the disclosure provides a method for establishing a communications session with a first UE. The method includes establishing, by a core network portion of a wireless communication network, a session with a second Access Management Function (AMF). Querying, by the second AMF, the core network portion, to determine a first AMF associated with the first UE and utilizing the first AMF to determine a location of the first UE. The second AMF acts as a proxy for the first AMF for managing the communication session between the core network and the first UE.

In another aspect of the disclosure, the first AMF transfers a message through the second AMF for relaying to the core network portion.

In another aspect of the disclosure, the second AMF transfers a message through the first AMF.

Another aspect of the disclosure includes a plurality of UEs and a plurality of AMFs. The first UE is one of the plurality of UEs. The first AMF is one of the plurality of AMFs. Each of the plurality of AMFs services one of the plurality of UEs, and the second AMF acts as a proxy for the plurality of AMFs to manage communication sessions between the core network and the plurality of UEs.

In another aspect of the disclosure, the communication sessions include a broadcast communication session.

In another aspect of the disclosure, the communication sessions include a multicast communication session.

In another aspect of the disclosure, the communication sessions include a unicast communication session.

In another aspect of the disclosure, the message is a GC Session Announcement message, and the method further includes relaying, by the second AMF to the first AMF, the message being to the first UE.

Another aspect of the disclosure includes, in response to the message, relaying from the first AMF through the second AMF, a confirmation message, to the core network.

In another aspect of the disclosure, the second AMF combines information received from the first AMF with the message before relaying the message to the core network portion.

In another aspect of the disclosure, the second AMF stores the message received from the first AMF until a number of further messages are received from the first AMF before relaying the message and the further messages to the core network portion.

In another aspect of the disclosure, communications between the first AMF and the second AMF utilize a service based interface, the first AMF supports communications between the first UE and the second AMF, and the second AMF supports communications between the first AMF and the core network portion.

In another aspect of the disclosure, determining a location of the first UE comprises accessing a list of RAN node addresses provided by the core network portion.

In another aspect of the disclosure, determining a location of the first UE comprises performing a discovery procedure to identify the first AMF.

In another aspect of the disclosure, the message includes the second AMF providing an internal group ID to the first AMF, the first AMF responding to the second AMF with a RAN node address serving the first UE.

In another aspect of the disclosure, the message includes an identifier of the core network portion or an identifier of the second AMF.

In another aspect of the disclosure, the message results from a notification service of the first AMF, the second AMF subscribing the notification service on behalf of the core network portion.

In another aspect of the disclosure, the message comprises the second AMF creating a Temporary Mobile Group Identity for the first UE.

An aspect of the disclosure provides a method for managing a group communications (GC) session. The method is performed by an Access Management Function (AMF) and includes: receiving a GC session establishment request from a session management function (SMF); transmitting to an access node, the GC session establishment request; receiving a GC session establishment response from the access node; transmitting the GC session management response to the session management function; communicating with the radio access node over a service based interface to cause the access node to support a group communication session with a first UE. In some embodiments, the AMF is selected by the session management function. In some embodiments, the method includes selecting a data management function and transmitting a GC session information request to the to the data management function, and receiving a GC session information response from the data management function with the GC session information response comprising parameters of the GC session. In some embodiments, the method includes selecting a policy control function and transmitting a GC session policy request to the policy control function, and receiving a GC session policy response from the policy control function where the GC session policy response comprising an access and mobility management policy for the GC session. In some embodiments, the AMF selects the session management function. In some embodiments, the method includes discovering the access node associated with the first UE. In some embodiments, the method includes transmitting a GC serving function registration request to the data repository function, and receiving a GC serving function registration response from the data repository function where the GC serving function registration response includes information associating a UE group and a network resource and the UE group includes the first UE. In some embodiments, the first UE is one of a plurality of UEs and the GC session comprises a broadcast communication to the plurality of UEs. In some embodiments, the first UE is one of a plurality of UEs and the GC session comprises a multicast communication to the plurality of UEs. In some embodiments, the first UE is one of a plurality of UEs and the plurality of UEs is defined by a group identifier.

An aspect of the disclosure provides a method for managing a group communications (GC) session. The method is performed by an Access Management Function (AMF) and includes transmitting a discover access management function request to a network discovery function to identify a first unicast AMF. The first unicast AMF is configured to manage access and mobility for a first UE associated with an access node. Receiving from a session management function, a GC session announcement request. Transmitting the GC session announcement request to the first unicast AMF. Receiving from the first unicast AMF, a GC session announcement response. Transmitting the GC session announcement response to the session management function. Receiving from the first unicast AMF, a GC session announcement notification. Transmitting the GC session announcement notification to the session management function. Communicating with the access node over a service based interface to cause the access node to support a group communication session with the first UE. The AMF acts as a proxy for communications between the first unicast AMF and the session management function. In some embodiments, transmitting from the AMF to the first unicast AMF and receiving from the first unicast AMF by the AMF is done over the service based interface. In some embodiments, the AMF acts as a proxy for communications between a plurality of unicast access management functions and the session management function and the first unicast AMF is one of the plurality of access management functions. In some embodiments, the first UE is one of a plurality of UEs and the GC session comprises a broadcast communication to the plurality of UEs. In some embodiments, the first UE is one of a plurality of UEs and the GC session comprises a multicast communication to the plurality of UEs. In some embodiments, the first UE is one of a plurality of UEs and the plurality of UEs is defined by a group identifier.

An aspect of the disclosure provides an access management function (AMF) including a network interface for receiving and transmitting messages, a processor, and a non-transient memory for storing instructions. When executed by the processor, the instructions cause the AMF to transmit a discover access management function request to a network discovery function to identify a first unicast AMF. The first unicast AMF is configured to manage access and mobility for a first UE associated with an access node. Receive from a session management function, a GC session announcement request. Transmit the GC session announcement request to the first unicast AMF. Receive from the first unicast AMF, a GC session announcement response. Transmit the GC session announcement response to the session management function. Receive from the first unicast AMF, a GC session announcement notification. Transmit the GC session announcement notification to the session management function. Communicate with the access node over a service based interface to cause the access node to support a group communication session with the first UE. The AMF acts as a proxy for communications between the first unicast AMF and the session management function. In some embodiments, transmitting from the AMF to the first unicast AMF and receiving from the first unicast AMF by the AMF is done over the service based interface. In some embodiments, the AMF acts as a proxy for communications between a plurality of unicast access management functions and the session management function, the first unicast AMF being one of the plurality of access management functions. In some embodiments, the first UE is one of a plurality of UEs and the GC session comprises a broadcast communication or a multicast communication to the plurality of UEs.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of an Access Management Function (AMF) for managing a group communications (CG) session in a communications network, the method comprising:
   receiving, by the AMF, a GC session establishment request from a session management function, the GC session establishment request including network slice information and an error correction protocol, and a location of a group communication service;
   transmitting, by the AMF, to an access node in the location of the group communication service, the GC session establishment request;
   receiving, by the AMF, a GC session establishment response from the access node;
   transmitting, by the AMF, a GC session management response to the session management function; and
   communicating, by the AMF, with the access node over a service based interface to cause the access node to support a group communication session with a first user equipment (UE).

2. The method of claim 1 wherein the AMF is selected by the session management function based on the location of the group communication service.

3. The method of claim 1 further comprising:
   selecting a data management function and transmitting a GC session information request to the to the data management function; and
   receiving a GC session information response from the data management function, the GC session information response comprising parameters of the GC session.

4. The method of claim 1 further comprising:
selecting a policy control function and transmitting a GC session policy request to the policy control function; and
receiving a GC session policy response from the policy control function, the GC session policy response comprising an access and mobility management policy for the GC session.

5. The method of claim 1 further comprising selecting the session management function.

6. The method of claim 1 further comprising discovering the access node associated with the first UE.

7. The method of claim 1 further comprising:
transmitting a GC serving function registration request to a data repository function; and
receiving a GC serving function registration response from the data repository function, the GC serving function registration response comprising information associating a UE group and a network resource, the UE group comprising the first UE.

8. The method of claim 1 wherein the first UE is one of a plurality of UEs and the GC session comprises a broadcast communication to the plurality of UEs.

9. The method of claim 1 wherein the first UE is one of a plurality of UEs and the GC session comprises a multicast communication to the plurality of UEs.

10. The method of claim 1 wherein the first UE is one of a plurality of UEs and the plurality of UEs is defined by a group identifier.

11. An apparatus comprising:
a processor; and
a non-transitory machine readable medium storing instructions when executed by the processor configuring the apparatus to execute steps of:
receiving, by an Access Management Function (AMF), a group communications (GC) session establishment request from a session management function, the GC session establishment request including network slice information and an error correction protocol, and a location of a group communication service;
transmitting, by the AMF, to an access node in the location of the group communication service, the GC session establishment request;
receiving, by the AMF, a GC session establishment response from the access node;
transmitting, by the AMF, a GC session management response to the session management function; and
communicating, by the AMF, with the access node over a service based interface to cause the access node to support a group communication session with a first user equipment (UE).

12. A non-transitory machine readable medium storing instructions when executed by a processor configuring the processor to execute steps of:
receiving, by an Access Management Function (AMF), a group communications (GC) session establishment request from a session management function, the GC session establishment request including network slice information and an error correction protocol, and a location of a group communication service;
transmitting, by the AMF, to an access node in the location of the group communication service, the GC session establishment request;
receiving, by the AMF, a GC session establishment response from the access node;
transmitting, by the AMF, a GC session management response to the session management function; and
communicating, by the AMF, with the access node over a service based interface to cause the access node to support a group communication session with a first user equipment (UE).

* * * * *

UNITED STATES PATENT AND TRADEMARK OFFICE
CERTIFICATE OF CORRECTION

PATENT NO. : 11,382,145 B2
APPLICATION NO. : 16/531089
DATED : July 5, 2022
INVENTOR(S) : Ngoc Dung Dao and Xu Li It is certified that error appears in the above-identified patent and that said Letters Patent is hereby corrected as shown below:

In the Specification

In the description:

Column 5, Line 40:
"SW" should read --SMF--

Column 5, Line 43:
"SW" should read --SMF--

Column 5, Line 46:
"SW" should read --SMF--

Column 10, Line 55:
"the MSF 310-2" should read --SMF 310-2--

Column 10, Line 61:
"the MSF 310-1and MSF" should read --SMF 310-1 and SMF--

Column 10, Line 62:
"the MSF 310" should read --SMF 310--

Column 11, Line 20:
"the MSF 310" should read --SMF 310--

Column 11, Line 33:
"the MSF 310" should read --SMF 310--

Column 11, Line 38:
"the MSF 310" should read --SMF 310--

Signed and Sealed this
Fifth Day of March, 2024

Katherine Kelly Vidal
*Director of the United States Patent and Trademark Office*